(12) United States Patent
Shimamoto et al.

(10) Patent No.: US 8,546,980 B2
(45) Date of Patent: Oct. 1, 2013

(54) RADIO-FREQUENCY MODULE AND RADIO COMMUNICATION SYSTEM

(75) Inventors: Kenichi Shimamoto, Kanagawa (JP); Yoshiaki Harasawa, Kanagawa (JP); Tadashi Matsuoka, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 109 days.

(21) Appl. No.: 13/314,241

(22) Filed: Dec. 8, 2011

(65) Prior Publication Data

US 2012/0163247 A1  Jun. 28, 2012

(30) Foreign Application Priority Data

Dec. 27, 2010  (JP) .................................. 2010-289782

(51) Int. Cl.
*H02M 3/06* (2006.01)
(52) U.S. Cl.
USPC .......................................................... 307/109
(58) Field of Classification Search
None
See application file for complete search history.

(56) References Cited

U.S. PATENT DOCUMENTS

| 5,423,076 A * | 6/1995 | Westergren et al. ............. 455/86 |
| 2006/0006986 A1* | 1/2006 | Gravelle et al. ............... 340/10.3 |
| 2007/0281651 A1* | 12/2007 | Oosawa et al. ............. 455/245.1 |
| 2010/0117713 A1 | 5/2010 | Katoh et al. |
| 2011/0074220 A1* | 3/2011 | Iijima et al. .................... 307/109 |

FOREIGN PATENT DOCUMENTS

JP   2010-114837 A   5/2010

* cited by examiner

*Primary Examiner* — Raj Jain
(74) *Attorney, Agent, or Firm* — Mattingly & Malur, PC

(57) ABSTRACT

There is provided a radio-frequency module and a radio communication system capable of supporting multiple bands at low cost or small size. A high-frequency power amplifier device includes a power amplifier circuit unit for GSM and a control circuit outputting antenna switch control signals with a VSW1 level or a VSW2 level in response to a mode setting signal for selecting GSM or W-CDMA. The VSW2 level is generated by boosting the VSW1 level using a clock signal from an oscillation circuit. When GSM is selected by the mode setting signal, the high-frequency power amplifier device stops the oscillation circuit and outputs the antenna switch control signals of the VSW1 level to an antenna switch device. When W-CDMA is selected by the mode setting signal, the high-frequency power amplifier device outputs the antenna switch control signals of the VSW2 level to the antenna switch device, using the oscillation circuit.

15 Claims, 14 Drawing Sheets

FIG. 6

| | Mode | Input (Mctl) | | | | | Output (Sctl) | | | | | | | |
|---|---|---|---|---|---|---|---|---|---|---|---|---|---|---|
| | | TX_EN | BS1 | BS2 | TR_SW_EN | VSW | TX LBC | TX LBL | TX HBC | TX HBL | RX 1800 | RX 900 | TRXAC | TRXBC |
| A | Sleep | 0 | 0 | 0 | 0 | L | L | L | L | L | L | L | L | L |
| B | LB GMSK isolation | 1 | 0 | 0 | 0 | VSW1 | L | L | L | L | L | L | L | L |
| C | LB GMSK | 1 | 0 | 0 | 1 | VSW1 | VSW1 | HiZ | L | L | L | L | L | L |
| D | HB GMSK isolation | 1 | 1 | 0 | 0 | VSW1 | L | L | L | L | L | L | L | L |
| E | HB GMSK | 1 | 1 | 0 | 1 | VSW1 | L | L | VSW1 | HiZ | L | L | L | L |
| G | RX2(HB) enable (1800) | 0 | 1 | 0 | 1 | VSW1 | L | L | L | L | VSW1 | L | L | L |
| H | RX3 (LB) enable (900) | 0 | 0 | 0 | 1 | VSW1 | L | L | L | L | L | VSW1 | L | L |
| J | TRX1 (TRXAC) | 0 | 0 | 1 | 0 | VSW2 | L | L | L | L | L | L | VSW2 | L |
| K | TRX2 (TRXBC) | 0 | 0 | 1 | 1 | VSW2 | L | L | L | L | L | L | L | VSW2 |

RADIO-FREQUENCY MODULE AND RADIO COMMUNICATION SYSTEM

CROSS-REFERENCE TO RELATED APPLICATIONS

The disclosure of Japanese Patent Application No. 2010-289782 filed on Dec. 27, 2010 including the specification, drawings and abstract is incorporated herein by reference in its entirety.

BACKGROUND

The present invention relates to a radio-frequency module and a radio communication system, and in particular, relates to a technique effectively applied to a radio-frequency module and a radio communication system that support a plurality of frequency bands (multiple bands) such as GSM and W-CDMA.

For example, Japanese Unexamined Patent Publication No. 2010-114837 describes an antenna switch that supports GSM low and high bands.

SUMMARY

In recent years, radio communication systems such as cellular phones have been increasingly downsized and diversified into various kinds; accordingly, systems that support a plurality of frequency bands (multiple bands) are required. In such a system, an electronic component (called a radio-frequency module) incorporating, e.g., an antenna switch, a transmission power amplifier provided in the preceding stage, and the like is disposed immediately near an antenna. In the antenna switch, with the progression of multiple bands, the configuration of the so-called SP4T (Single Pole Four Throw) for coupling any one of four terminals composed of two pairs of transmission terminals and reception terminals to one antenna terminal needs to be extended to the configuration of SP5T, SP6T, etc.

A typical antenna switch having the SP4T configuration supports GSM (Global System for Mobile communication) low and high bands. In the GSM low band, for example, transmission frequencies of approximately 824 to 915 MHz and reception frequencies of approximately 869 to 960 MHz are used. The GSM high band is also referred to as DCS (Digital Cellular System), and in the band, transmission frequencies of approximately 1710 to 1910 MHz and reception frequencies of approximately 1805 to 1990 MHz are used. On the other hand, in SP5T, SP6T, etc., for example, bands for W-CDMA (Wideband Code Division Multiple Access) called the third generation (3G or UMTS (Universal Mobile Telecommunications System) are added to the above-described bands. In W-CDMA, more than 10 kinds of bands are defined, and generally the system supports several bands selected therefrom.

In the antenna switch of SP4T, switches configured with HEMTs (High Electron Mobility Transistors) etc. are disposed between the antenna terminal and the transmission (reception) terminals, and the switches are on/off-controlled as appropriate. At this time, in order to reduce switch insertion loss during transmission and suppress transmission signal distortion caused by switches, a power supply voltage (e.g., about 5 V) higher than a normal power supply voltage (e.g., about 3 V) is used, as is known. As a method thereof, a booster circuit is provided between the transmission terminal (source node) and gate node of the HEMT, by which a boosted voltage is generated using a GSM transmission signal and the gate node is driven by the boosted voltage.

With this method, it is possible to drive the switch by sufficient on and off voltages in GSM, but it might be not possible to implement it in W-CDMA. This is because a W-CDMA transmission signal is generally smaller in signal level than the GSM transmission signal, which may cause an insufficient boosting operation. On the other hand, further reduction in transmission signal distortion is required in W-CDMA than in GSM. This is because since an FDD (Frequency Division Duplex) scheme is used in W-CDMA unlike in GSM, intermodulation distortion (IMD) by a transmission signal and a reception signal becomes a problem.

Therefore, it is necessary to supply a boosted voltage to the antenna switch in some way to reduce transmission signal distortion in W-CDMA. As a possible method, a DC-DC converter or the like is provided outside the radio-frequency module, and a boosted voltage generated by the DC-DC converter is supplied to the radio-frequency module and drives the antenna switch. However, in this case, there is apprehension that the provision of the DC-DC converter or the like increases the size and cost of the whole system.

The present invention has been made in view of such a circumstance, and it is an object of the invention to provide a radio-frequency module and a radio communication system capable of supporting multiple bands at low cost or small size. The above and other objects and novel features of the present invention will become apparent from the description of this specification and, the accompanying drawings.

A typical embodiment of the invention disclosed in the present application will be briefly described as follows.

In a radio-frequency module according to this embodiment, a high-frequency power amplifier device and an antenna switch device configured with different semiconductor chips are mounted over the same wiring board. The high-frequency power amplifier device includes a circuit for amplifying a transmission signal of a first frequency band and a circuit for outputting a control signal for the antenna switch device with a first voltage level or a second voltage level in response to a mode setting signal for selecting the first frequency band or a second frequency band. The second voltage level is generated by boosting the first voltage level using a clock signal from an oscillation circuit. When the first frequency band is selected by the mode setting signal, the high-frequency power amplifier device stops the oscillation circuit and outputs the control signal of the first voltage level to the antenna switch device. When the second frequency band is selected by the mode setting signal, the high-frequency power amplifier device outputs the control signal of the second voltage level to the antenna switch device, using the oscillation circuit.

With this, in the antenna switch device, in the coupling of a transmission signal of the second frequency band to an antenna, it is possible to set an on switch to low insertion loss and to set an off switch to a deep off state by using the control signal of the boosted second voltage level. On the other hand, in the coupling of the transmission signal of the first frequency band to the antenna, it is possible to set an on switch to low insertion loss and to set an off switch to a deep off state, e.g., by boosting the control signal of the first voltage level utilizing the transmission signal. At this time, an amplifier circuit is activated in the high-frequency power amplifier device. However, since the oscillation circuit is stopped, a problem such as spurious emission does not occur. Accordingly, it is possible to integrate a booster circuit into the high-frequency power amplifier device without problems, thereby making it possible to reduce the cost or size of the radio-frequency module and the cost or size of a radio communication system.

According to an effect of the typical embodiment of the invention disclosed in the present application, it is possible to achieve cost or size reduction in the radio-frequency module and the radio communication system supporting multiple bands.

BRIEF DESCRIPTION OF THE DRAWINGS

FIG. 6 is a truth table showing a detailed operation example of an overall control circuit and an antenna switch control circuit in FIG. 4.

DETAILED DESCRIPTION

Figure 1:
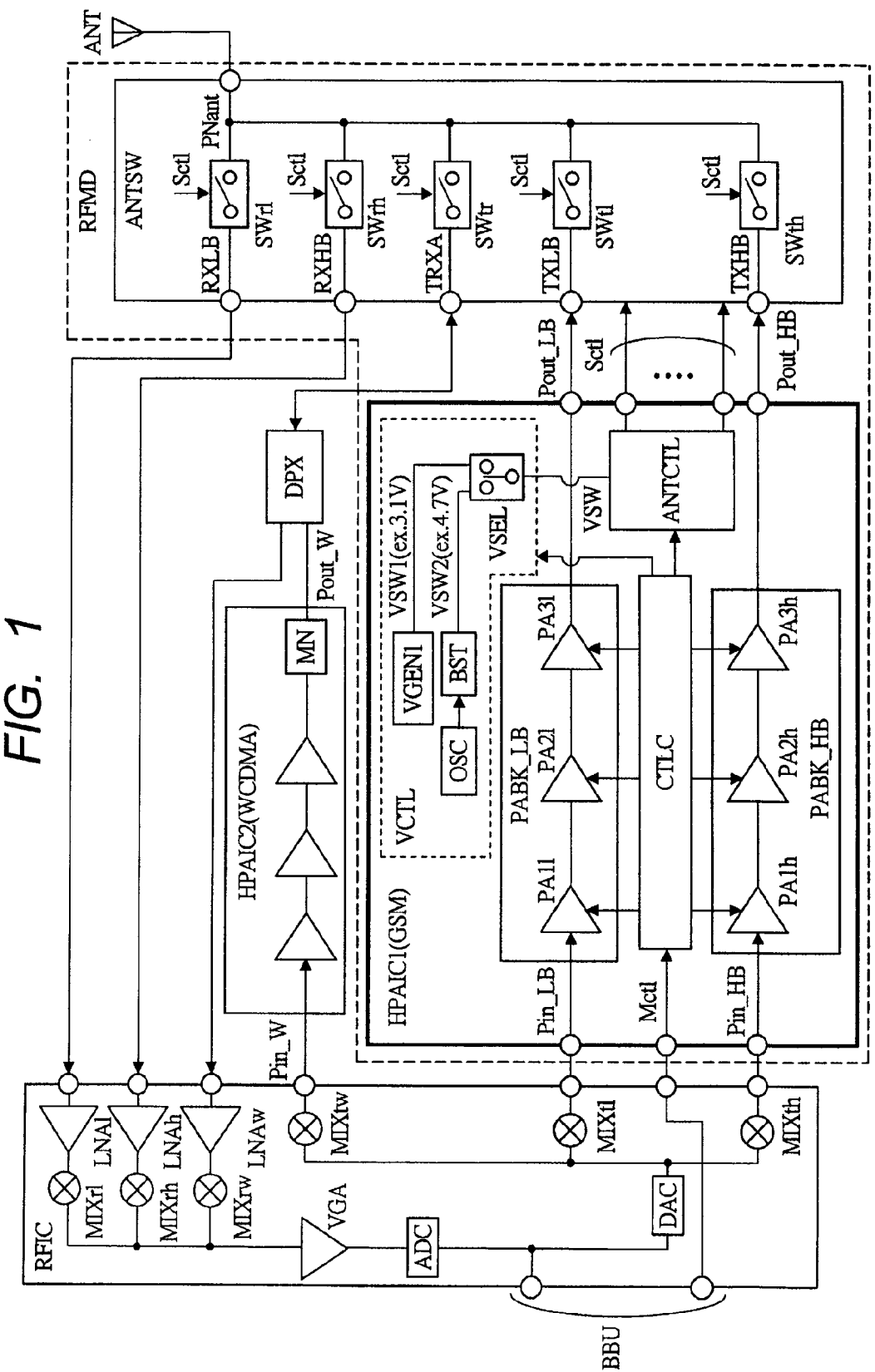
FIG. 1 is a block diagram showing a schematic configuration example of the main part of a radio communication system according to an embodiment of the present invention.

In the following embodiments, description will be made by dividing an embodiment into a plurality of sections or embodiments when necessary for the sake of convenience; however, except when a specific indication is given, they are not mutually unrelated, but there is a relationship that one section or embodiment is a modification, specification, or supplementary explanation of part or all of another section or embodiment. Further, in the case where the following embodiments deal with a numerical expression (including a number, a numerical value, amount, range) concerning elements, the numerical expression is not limited to the specific number but may be larger or smaller than the specific number except when a specific indication is given or when the expression is apparently limited to the specific number in principle.

Furthermore, in the following embodiments, the components (including element steps) are not always indispensable except when a specific indication is given or when they are apparently considered to be indispensable in principle. Similarly, in the case where the following embodiments deal with the shape, positional relationship, etc., of the components etc., those substantially approximate or similar to them in shape etc. are also included except when a specific indication is given or when they are apparently considered to be excluded in principle. This also applies to numerical values and ranges described above.

Further, although in the embodiments a MOSFET (Metal Oxide Semiconductor Field Effect Transistor) (abbreviated as a MOS transistor) is used as an example of a MISFET (Metal Insulator Semiconductor Field Effect Transistor), this does not exclude a non-oxide film as a gate insulating film. Hereinafter, preferred embodiments of the present invention will be described in detail with reference to the accompanying drawings. In all the drawings for illustrating the embodiments, the same components or members are basically denoted by the same reference numerals, and their description will not be repeated.

<<Schematic Configuration of Main Part of Whole Radio Communication System>>

FIG. 1 is a block diagram showing a schematic configuration example of the main part of a radio communication system according to an embodiment of the invention. The radio communication system shown in FIG. 1 includes a radio-frequency signal processing device RFIC, a radio-frequency module RFMD, a high-frequency power amplifier device HPAIC2, a duplexer DPX, and an antenna ANT. The radio-frequency module RFMD is implemented by e.g. a single wiring board, and includes a high-frequency power amplifier device HPAIC1 and an antenna switch device ANTSW over the wiring board. The signal processing device RFIC is configured with e.g. a single semiconductor chip, and includes low-noise amplifier circuits LNAl, LNAh, LNAw, reception mixer circuits MIXrl, MIXrh, MIXrw, a variable gain amplifier circuit VGA, an analog-to-digital converter circuit ADC, a digital-to-analog converter circuit DAC, and transmission mixer circuits MIXtl, MIXth, MIXtw.

The converter circuit DAC converts a transmission baseband signal (digital signal) from a baseband unit BBU into an analog baseband signal, and sends it to the mixer circuit MIXtl, MIXth, or MIXtw. The mixer circuit MIXtl frequency-converts an analog baseband signal from the converter circuit DAC into a GSM low band (e.g., approximately 824 to 915 MHz), and outputs it as a low-band power input signal Pin_LB to the radio-frequency module RFMD. The mixer circuit MIXth frequency-converts an analog baseband signal from the converter circuit DAC into a GSM high band (DCS) (e.g., approximately 1710 to 1910 MHz), and outputs it as a high-band power input signal Pin_HB to the radio-frequency module RFMD. The mixer circuit MIXtw frequency-converts an analog baseband signal from the converter circuit DAC into a W-CDMA band, and outputs it as a W-CDMA power input signal Pin_W to the amplifier device HPAIC2.

The amplifier circuit LNAl amplifies a reception signal (RXLB) of a GSM low band (e.g., approximately 869 to 960 MHz) outputted from the radio-frequency module RFMD, and the mixer circuit MIXrl frequency-converts the reception signal into a baseband signal. The amplifier circuit LNAh amplifies a reception signal (RXHB) of a GSM high band (e.g., approximately 1805 to 1990 MHz) outputted from the radio-frequency module RFMD, and the mixer circuit MIXrh frequency-converts the reception signal into a baseband signal. In reality, for the selection between the frequency bands, a bandpass filter (e.g., SAW (Surface Acoustic Wave) filter) or the like is disposed between the radio-frequency module RFMD and the signal processing device RFIC. The amplifier circuit LNAw receives a W-CDMA reception signal (TRXA) outputted from the radio-frequency module RFMD through the duplexer DPX and amplifies the signal. The mixer circuit MIXrw frequency-converts the output signal of the amplifier circuit LNAw into a baseband signal. The amplifier circuit VGA amplifies the analog baseband signal outputted from the mixer circuits MIXrl, MIXrh, or MIXrw by a predetermined gain. The converter circuit ADC converts the analog baseband signal from the amplifier circuit VGA into a reception baseband signal (digital signal) and outputs it to the baseband unit BBU.

The high-frequency power amplifier device HPAIC2 is a device for W-CDMA, and is configured with e.g. a single semiconductor chip (MMIC: Monolithic Microwave Integrated Circuit). The amplifier device HPAIC2 includes, for example, power amplifier circuits coupled in multiple stages and an impedance matching circuit MN coupled to the final-stage amplifier circuit. The amplifier device HPAIC2 receives and amplifies the W-CDMA power input signal Pin_W, and outputs a W-CDMA power output signal Pout_W through the matching circuit MN to the duplexer DPX. The power amplifier circuits are configured with heterojunction bipolar transistors (HBTs) formed of a compound semiconductor such as gallium arsenide (GaAs), silicon germanium (SiGe), or the like. Since W-CDMA is particularly required to have higher power added efficiency (PAE) and lower distortion characteristics than GSM, it is advantageous to use HBTs. The duplexer DPX outputs the signal Pout_W (transmission signal) from the amplifier device HPAIC2 to the radio-frequency module RFMD (switch device ANTSW), and outputs the reception signal inputted from the radio-frequency module RFMD (switch device ANTSW) to the amplifier circuit LNAw in the signal processing device RFIC. That is, the duplexer DPX includes, for example, a bandpass filter circuit for a transmission band and a bandpass filter circuit for a reception band to separate the transmission signal and the reception signal.

In the radio-frequency module RFMD, the amplifier device HPAIC1 is configured with e.g. a single semiconductor chip, and includes two power amplifier circuit units PABK_LB and PABK_HB, an overall control circuit CTLC, an antenna switch control circuit ANTCTL, and an antenna switch voltage control circuit VCTL. The amplifier circuit unit PABK_LB is a unit for the GSM low band, and includes power amplifier circuits PA1*l* to PA3*l* coupled in multiple stages (three stages in this example). The amplifier circuit unit PABK_LB receives and amplifies the low-band power input signal Pin_LB, and outputs a GSM low-band power output signal Pout_LB from the amplifier circuit PA3*l* to the switch device ANTSW. The amplifier circuit unit PABK_HB is a unit for the GSM high band, and includes power amplifier circuits PA1*h* to PA3*h* coupled in multiple stages (three stages in this example). The amplifier circuit unit PABK_HB receives and amplifies the high-band power input signal Pin_HB, and outputs a GSM high-band power output signal Pout_HB from the amplifier circuit PA3*h* to the switch device ANTSW.

The overall control circuit CTLC receives a mode setting signal Mctl inputted through the signal processing device RFIC from the baseband unit BBU. In response thereto, the overall control circuit CTLC performs the control of activation/deactivation of the amplifier circuit units PABK_LB and PABK_HB and the control of the antenna switch voltage control circuit VCTL and outputs various control signals to the antenna switch control circuit ANTCTL. The mode setting signal Mctl is a signal for selectively setting a transmission mode or a reception mode of the GSM low band, a transmission mode or a reception mode of the GSM high band, or a transmission/reception mode of W-CDMA, for example. In accordance with the mode setting signal Mctl, the control circuit CTLC outputs various control signals indicating the on/off states of the switches in the antenna switch ANTSW. The control circuit ANTCTL sets the voltage level of the various control signals to the voltage level of an antenna switch voltage VSW determined by the control circuit VCTL, and then outputs them as antenna switch control signals Sctl.

The antenna switch voltage control circuit VCTL includes an oscillation circuit OSC, a booster circuit BST, a voltage generation circuit VGEN1, and a voltage selection circuit VSEL. The voltage generation circuit VGEN1 generates a first antenna switch voltage VSW1 (e.g., 3.1 V). The booster circuit BST generates a second antenna switch voltage VSW2 (e.g., 4.7 V) higher than VSW1, using a clock signal from the oscillation circuit OSC. The selection circuit VSEL selects either VSW1 or VSW2 as VSW and supplies it to the control circuit ANTCTL. The amplifier device HPAIC1 is formed by e.g. a MOS process (silicon process), and accordingly the power amplifier circuits PA1*l* to PA3*l* and PA1*h* to PA3*h* are configured with LDMOSFETs (Laterally Diffused Metal-Oxide-Semiconductor Field Effect Transistors). Thus, the power amplifier circuits are configured with MOSFETs and integrated including the control circuits CTLC, ANTCTL, and VCTL, thereby making it possible to reduce the cost or size of the radio-frequency module RFMD in comparison with the use of a compound semiconductor and reduce the cost or size of the radio communication system. That is, since GSM is not required to have better power added efficiency and distortion characteristics than W-CDMA, it is advantageous to use such a MOS process.

In the radio-frequency module RFMD, the antenna switch device ANTSW is configured with e.g. a single semiconductor chip (MMIC: Monolithic Microwave Integrated Circuit), and formed over a substrate of a compound semiconductor such as gallium arsenide (GaAs). In FIG. 1, the switch device ANTSW has an SP5T configuration including one antenna coupling terminal PNant, two transmission terminals TXLB and TXHB, two reception terminals RXLB and RXHB, and one transmission/reception terminal TRXA. Antenna switch circuits SWtl, SWth, SWrl, SWrh, SWtr are provided between the terminal PNant and the terminals TXLB, TXHB, RXLB, RXHB, TRXA, respectively. The antenna switch circuits are configured with e.g. HEMTs, and individually on/off-controlled by the antenna switch control signals Sctl.

The low-band power output signal Pout_LB from the amplifier circuit unit PABK_LB is inputted to the transmission terminal TXLB, and the high-band power output signal Pout_HB from the amplifier circuit unit PABK_HB is inputted to the transmission terminal TXHB. The reception terminal RXLB is coupled to the amplifier circuit LNAl in the signal processing device RFIC, and the reception terminal RXHB is coupled to the amplifier circuit LNAh in the signal processing device RFIC. The transmission/reception terminal TRXA is coupled to the duplexer DPX. While SP5T having one band for W-CDMA in addition to the GSM low and high bands is shown in FIG. 1, this can be appropriately extended to e.g. SP6T or SP7T having two bands or three bands for W-CDMA respectively in addition to the GSM low and high bands. For example, in the case of extension to SP6T, a switch circuit is added in the switch device ANTSW, a duplexer and a high-frequency power amplifier device are added, and a low-noise amplifier circuit and a mixer circuit are appropriately added in the signal processing device RFIC. In this case, it is also possible to form the high-frequency power amplifier device in the same semiconductor chip as the amplifier device HPAIC2.

In this configuration example, one of the primary features of the radio communication system and the radio-frequency module according to this embodiment is that the antenna switch voltage control circuit VCTL is provided in the high-frequency power amplifier device HPAIC1 for GSM. Specifically, at the time of selection of the GSM low band and high band by the mode setting signal Mctl, the control circuit VCTL stops the operation of the oscillation circuit OSC (deactivates the oscillation circuit OSC and the booster circuit BST) and selects the voltage VSW1 through the selection circuit VSEL in accordance with control by the control circuit CTLC. On the other hand, at the time of selection of W-CDMA by the mode setting signal Mctl, the control circuit VCTL operates the oscillation circuit OSC and the booster circuit BST (activates the oscillation circuit OSC and the booster circuit BST) and selects the voltage VSW2 through the selection circuit VSEL in accordance with control by the control circuit CTLC.

Figure 2:
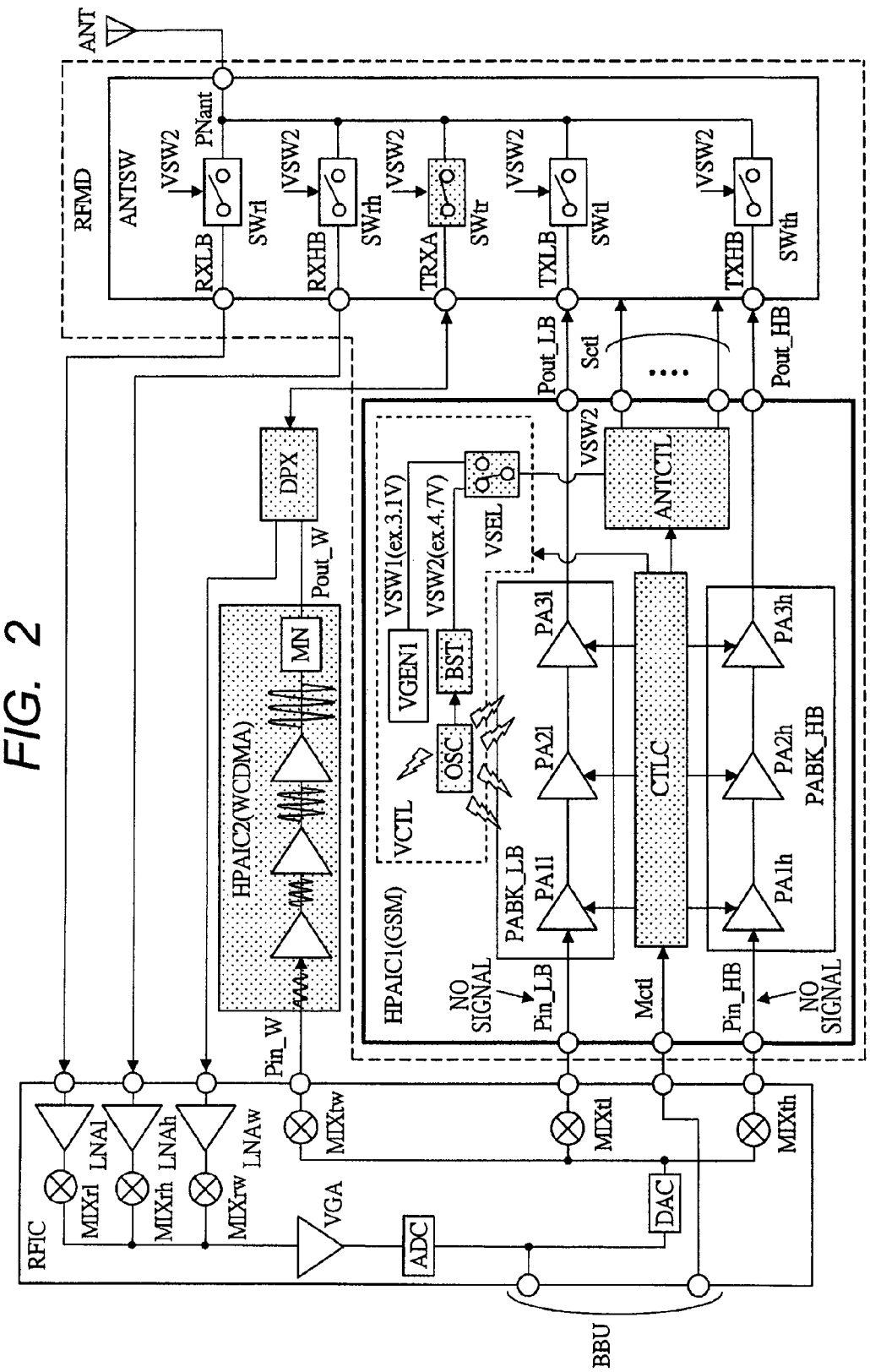
FIG. 2 is an explanation diagram showing an operation example when W-CDMA is selected in the radio communication system of FIG. 1.
Figure 3:
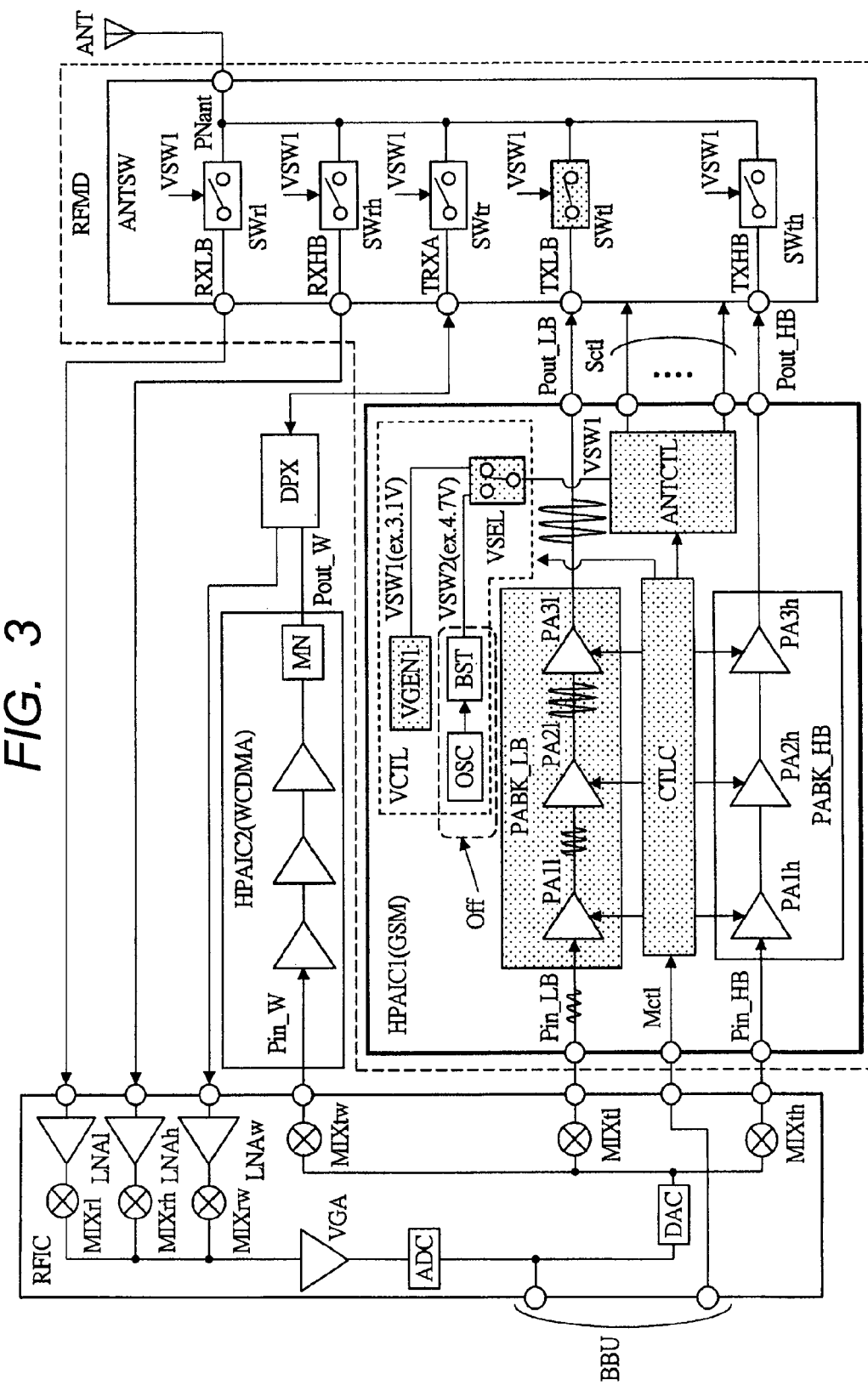
FIG. 3 is an explanation diagram showing an operation example when GSM is selected in the radio communication system of FIG. 1.

FIG. 2 is an explanation diagram showing an operation example when W-CDMA is selected in the radio communication system of FIG. 1. FIG. 3 is an explanation diagram showing an operation example when GSM is selected in the radio communication system of FIG. 1. First, as shown in FIG. 2, when W-CDMA is selected by the mode setting signal Mctl, the high-frequency power amplifier device HPAIC2 is activated, and a coupling path between the duplexer DPX and the antenna ANT is established through the antenna switch circuit SWtr. In the high-frequency power amplifier device HPAIC1, the oscillation circuit OSC and the booster circuit BST are activated, and the voltage VSW2 (e.g., 4.7 V) is supplied to the antenna switch control circuit ANTCTL. Although the amplifier circuit units PABK_LB and PABK_HB do not perform amplification because the radio-frequency signals (Pin_LB, Pin_HB) are not inputted thereto, it is desirable that the amplifier circuit units PABK_LB and PABK_HB be set to a sleep state or the like for power saving in accordance with control by the control circuit CTLC. In the sleep state, the supply of a gate bias or a power supply voltage to the power amplifier circuits PA1*l* to PA3*l* and PA1*h* to PA3*h* in the amplifier circuit units PABK_LB and PABK_HB is stopped.

In the antenna switch device ANTSW, the switch circuits are on/off-controlled by the antenna switch control signals Sctl having the voltage level VSW2 outputted from the antenna switch control circuit ANTCTL. Specifically, the antenna switch circuit SWtr is turned on, and the other antenna switch circuits SWtl, SWth, SWrl, and SWrh are turned off. In this case, the use of the higher voltage VSW2 reduces insertion loss in the switch circuit SWtr and the switch circuits SWtl, SWth, SWrl, and SWrh are driven into a deep off state, which can reduce distortion that occurs in the transmission signal (Pout_W) transferred through the switch circuit SWtr.

Next, as shown in FIG. 3, when the GSM low band (transmission mode or reception mode) or high band (transmission mode or reception mode) is selected by the mode setting signal Mctl (in this example, the transmission mode of the low band is selected), the amplifier circuit unit PABK_LB in the high-frequency power amplifier device HPAIC1 is activated. Further, a coupling path between the amplifier circuit unit PABK_LB and the antenna ANT is established through the antenna switch circuit SWtl. The oscillation circuit OSC and the booster circuit BST are deactivated, and the voltage VSW1 (e.g., 3.1 V) is supplied to the antenna switch control circuit ANTCTL. Although the amplifier circuit unit PABK_HB does not perform amplification because the radio-frequency signal (Pin_HB) is not inputted thereto, it is desirable that the amplifier circuit unit PABK_HB be set to the sleep state or the like for power saving in accordance with control by the control circuit CTLC. Further, although the high-frequency power amplifier device HPAIC2 does not perform amplification, it is desirable that the amplifier device HPAIC2 be set to the sleep state or the like by a control circuit (not shown) for the amplifier device HPAIC2.

In the antenna switch device ANTSW, the switch circuits are on/off-controlled by the antenna switch control signals Sctl having the voltage level VSW1 outputted from the antenna switch control circuit ANTCTL. Specifically, the antenna switch circuit SWtl is turned on, and the other antenna switch circuits SWth, SWrl, SWrh, and SWtr are turned off. Although details will be described later, the switch circuits SWtl and SWth are provided with respective gate booster circuits at their on/off control terminals (gate nodes). Accordingly, although the control signals Sctl having the voltage level VSW1 are outputted from the control circuit ANTCTL, the voltage level that actually controls the switch circuits is a voltage level boosted by the gate booster circuit. This can reduce insertion loss in the switch circuit SWtl and distortion that occurs in the transmission signal (Pout_LB) transferred through the switch circuit SWtl.

Further, in the amplifier device HPAIC1, the deactivation of the oscillation circuit OSC and the booster circuit BST can reduce spurious emission (unnecessary waves) caused by the amplification operation of the amplifier circuit unit PABK_LB. Specifically, as a comparison example, assume that the amplifier circuit unit PABK_LB performs an amplification operation in a state where the oscillation circuit OSC and the booster circuit BST operate. Since the amplifier circuit unit PABK_LB, the oscillation circuit OSC, and the booster circuit BST are formed over the same semiconductor chip, the clock signal from the oscillation circuit OSC might get mixed in, as spurious emission, the amplifier circuit unit PABK_LB, and this signal might be amplified and radiated from the antenna. The deactivation of the oscillation circuit OSC and the booster circuit BST can prevent such a phenomenon. In this example, the transmission mode of the low band is selected. On the other hand, when the transmission mode of the high band is selected, the amplifier circuit unit PABK_HB is activated, and operations similar to those in the low band are performed accordingly.

As described above, the radio communication system and the radio-frequency module according to this embodiment include the high-frequency power amplifier device HPAIC1 having the amplifier circuits for GSM and the booster circuit for antenna switch control, and cause the amplifier device HPAIC1 to function as the GSM amplifier circuit in GSM and to function as the booster circuit for antenna switch control in W-CDMA. Although details will be described later, the boosted voltage for the antenna switches in GSM is generated in the antenna switch device ANTSW. On the other hand, it is not easy to generate the boosted voltage for the antenna switch in W-CDMA in the switch device ANTSW due to the difference in transmission power level between GSM and W-CDMA as described above. Accordingly, the boosted voltage for the antenna switch in W-CDMA is generated in the amplifier device HPAIC1, and the amplification operation in W-CDMA is performed in the separate chip (HPAIC2) which is not affected by spurious emission from the booster circuit in the amplifier device HPAIC1. This makes it possible to achieve the radio communication system and the radio-frequency module supporting multiple bands, that can sufficiently satisfy performance such as distortion characteristics and noise characteristics, at low cost or in a small area.

As a comparison example of the configuration shown in FIG. 1, there is a method for generating the boosted voltage by an external DC-DC converter or the like instead of providing the booster circuits in the amplifier device HPAIC1 and the switch device ANTSW. This might increase the size and cost of the radio communication system. As another comparison example, there is a method in which the booster circuit section (OSC and BST) included in the amplifier device HPAIC1 is provided in the switch device ANTSW instead of the amplifier device HPAIC1. In this case, the provision of the booster circuit section in the switch device ANTSW formed of e.g. a compound semiconductor substrate might increase the cost, and the booster circuit section might be a noise source affecting the transmission/reception signal from the antenna ANT. Therefore, the configuration example of FIG. 1 is more advantageous than these methods. In this example, the radio-frequency module RFMD is configured with the amplifier device HPAIC1 and the switch device ANTSW, but may include the amplifier device HPAIC2 and the duplexer DPX. However, it is desirable to separate the amplifier device HPAIC2 and the duplexer DPX from the radio-frequency module RFMD, for example in terms of a flexible combination of GSM and W-CDMA.

<<Detailed Configuration of Antenna Switch Voltage Control Circuit VCTL and Peripherals>>

Figure 4:
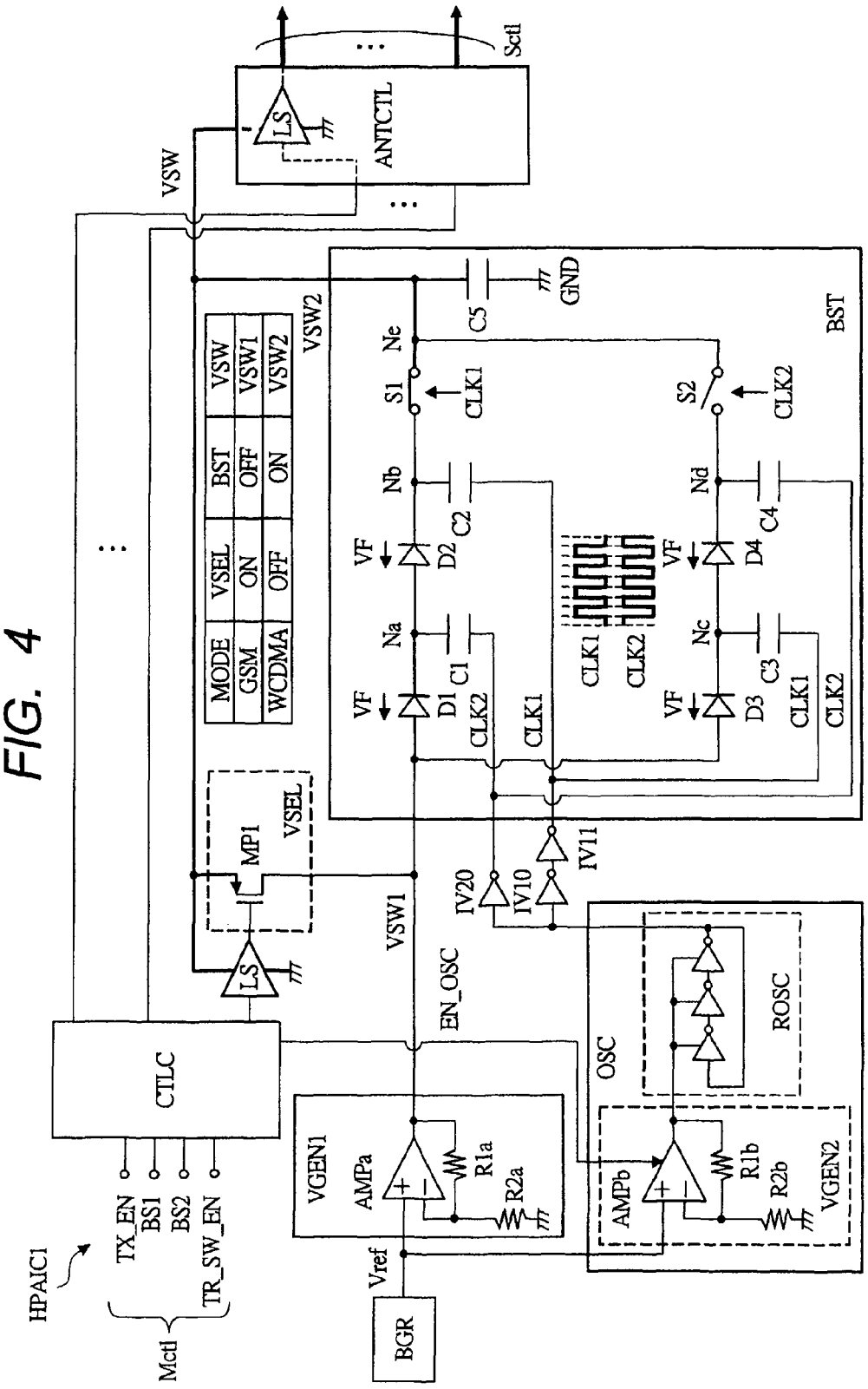
FIG. 4 is a circuit diagram showing a detailed configuration example of an antenna switch voltage control circuit and peripherals included in a high-frequency power amplifier device for GSM in the radio communication system of FIG. 1.

FIG. 4 is a circuit diagram showing a detailed configuration example of the antenna switch voltage control circuit VCTL and peripherals included in the high-frequency power amplifier device for GSM in the radio communication system of FIG. 1. As shown in FIG. 4, the voltage generation circuit VGEN1 in the control circuit VCTL is implemented by e.g. a negative-feedback amplifier circuit AMPa. The amplifier circuit AMPa receives a reference voltage Vref generated by a reference voltage generation circuit (bandgap reference circuit) BGR and independent of the external environment (power supply voltage (battery voltage), temperature, etc.), and generates the antenna switch voltage VSW1 (e.g., 3.1 V) determined by (Vref×(R2a)/(R1a+R2a) according to the ratio of resistors R1a and R2a. That is, even if the battery voltage fluctuates around 4 V, the amplifier circuit AMPa generates the constant voltage level.

The oscillation circuit OSC in the control circuit VCTL includes a negative-feedback amplifier circuit AMPb and a ring oscillator circuit ROSC configured with inverter circuits which operate at an output voltage from the amplifier circuit AMPb as a power supply voltage and are coupled in multiple (odd) stages in a ring form. Similarly to the amplifier circuit AMPa, the amplifier circuit AMPb receives the reference voltage Vref from the reference voltage generation circuit BGR, and generates the output voltage according to the ratio of resistors R1b and R2b. The oscillator circuit ROSC generates a clock signal having an oscillation frequency (e.g., 10 MHz) according to the output voltage. The clock signal becomes a positive clock signal CLK1 through inverter circuits IV10 and IV11, and becomes a negative clock signal CLK2 through an inverter circuit IV20.

The booster circuit BST in the control circuit VCTL includes a first charge pump circuit of the so-called Dickson-type which is comprised of diodes D1 and D2 and capacitors C1 and C2, a second charge pump circuit which is comprised of diodes D3 and D4 and capacitors C3 and C4 and operates in opposite phase of the first charge pump circuit, switch circuits S1 and S2 which combine output voltages of the first and second charge pump circuits, and a capacitor C5. The diode D1 is coupled between the output node (VSW1) of the voltage generation circuit VGEN1 and a node Na, in which the anode thereof is coupled to the VSW1 side and the cathode is coupled to the Na side. The diode D2 is coupled between nodes Na and Nb, in which the anode thereof is coupled to the Na side. One end of the capacitor C1 is coupled to the node Na, and the clock signal CLK2 is supplied to the other end of the capacitor C1. One end of the capacitor C2 is coupled to the node Nb, and the clock signal CLK1 is supplied to the other end of the capacitor C2.

The diode D3 is coupled between the output node (VSW1) of the voltage generation circuit VGEN1 and a node Nc, in which the anode thereof is coupled to the VSW1 side. The diode D4 is coupled between nodes Nc and Nd, in which the anode thereof is coupled to the Nc side. One end of the capacitor C3 is coupled to the node Nc, and the clock signal CLK1 is supplied to the other end of the capacitor C3. One end of the capacitor C4 is coupled to the node Nd, and the clock signal CLK2 is supplied to the other end of the capacitor C4. The switch circuit S1 is coupled at one end to the node Nb and at the other end to a node Ne. The switch circuit S2 is coupled at one end to the node Nd and at the other end to the node Ne. The capacitor C5 is coupled at one end to the node Ne and at the other end to a ground voltage GND. The switch circuit S1 is turned on by the 'H' level of the clock signal CLK1, and the switch circuit S2 is turned on by the 'H' level of the clock signal CLK2, so that the antenna switch voltage VSW2 (e.g., 4.7 V) is generated at the node Ne.

The voltage selection circuit VSEL in the control circuit VCTL is configured with a p-channel MOS transistor MP1 in this example. The transistor MP1 is coupled at its source to one end (node Ne) of the capacitor C5 and at its drain to the output node (VSW1) of the voltage generation circuit VGEN1. The gate of the transistor MP1 is driven by a control signal outputted through a level shift circuit LS from the overall control circuit CTLC. The level shift circuit LS converts the signal level (e.g., 3.1 V) of the control circuit CTLC into the voltage level of the source (node Ne which is one end of the capacitor C5) of the transistor MP1.

The overall control circuit CTLC receives various control signals TX_EN, BS1, BS2, and TR_SW_EN configuring the mode setting signal Mctl. In response thereto, the control circuit CTLC controls the voltage selection circuit VSEL, outputs various control signals to the antenna switch control circuit ANTCTL, and outputs an oscillation enable signal EN_OSC to the oscillation circuit OSC. The antenna switch control circuit ANTCTL receives the various control signals from the overall control circuit CTLC, converts the voltage level of the control signals into the voltage level of the antenna switch voltage VSW through a level shift circuit LS, and outputs them as the antenna switch control signals Sctl. The antenna switch voltage VSW can be obtained at the source (node Ne which is one end of the capacitor C5) of the transistor MP1.

Next, an operation example of FIG. 4 will be described. First, when the GSM low band or high band is selected by the mode setting signal Mctl (combination of TX_EN, BS1, BS2, and TR_SW_EN), the overall control circuit CTLC stops the operation of the oscillation circuit OSC, using the oscillation enable signal EN_OSC. Specifically, for example, the operation of the amplifier circuit AMPb is stopped by the deactivation level of the oscillation enable signal EN_OSC, and the output voltage is fixed to the GND level (or 'H' level). Accordingly, the oscillation circuit OSC stops the oscillation operation, so that the clock signal CLK1 is fixed to the 'L' level (GND level) and the clock signal CLK2 is fixed to the 'H' level. Further, the control circuit CTLC applies the 'L' level (GND level) to the gate of the transistor MP1 to turn on the transistor MP1. Thereby, the voltage level VSW becomes the voltage level VSW1 through the transistor MP1. At this time, a coupling path through the diodes D3 and D4 and the switch circuit S2 exists between the node Ne and the output node (VSW1) of the voltage generation circuit VGEN1; however, since the diodes D3 and D4 are reverse-biased, the coupling path is substantially cut off. The control circuit ANTCTL outputs the control signals Sctl using the voltage level VSW1 (e.g., 3.1 V).

On the other hand, when W-CDMA is selected by the mode setting signal Mctl (combination of TX_EN, BS1, BS2, and TR_SW_EN), the control circuit CTLC activates the oscillation circuit OSC using the oscillation enable signal EN_OSC so that the booster circuit BST performs a boosting operation, thereby generating the boosted voltage VSW2 at the node Ne. Further, the control circuit CTLC applies the 'H' level (voltage level VSW2 through the level shift circuit LS) to the gate of the transistor MP1 to turn off the transistor MP1. Thereby, the voltage level VSW becomes the voltage level VSW2 through the booster circuit BST. The control circuit ANTCTL outputs the control signals Sctl using the voltage level VSW2 (e.g., 4.7 V). Thus, in the configuration example of FIG. 4, the voltage VSW1 or VSW2 is selected using one transistor (MP1) as the voltage selection circuit VSEL. This makes it possible to reduce the circuit area, for example in comparison with a method of selection by simple complementary control of two switches.

<<Detailed Operation of Booster Circuit BST>>

Figure 5:
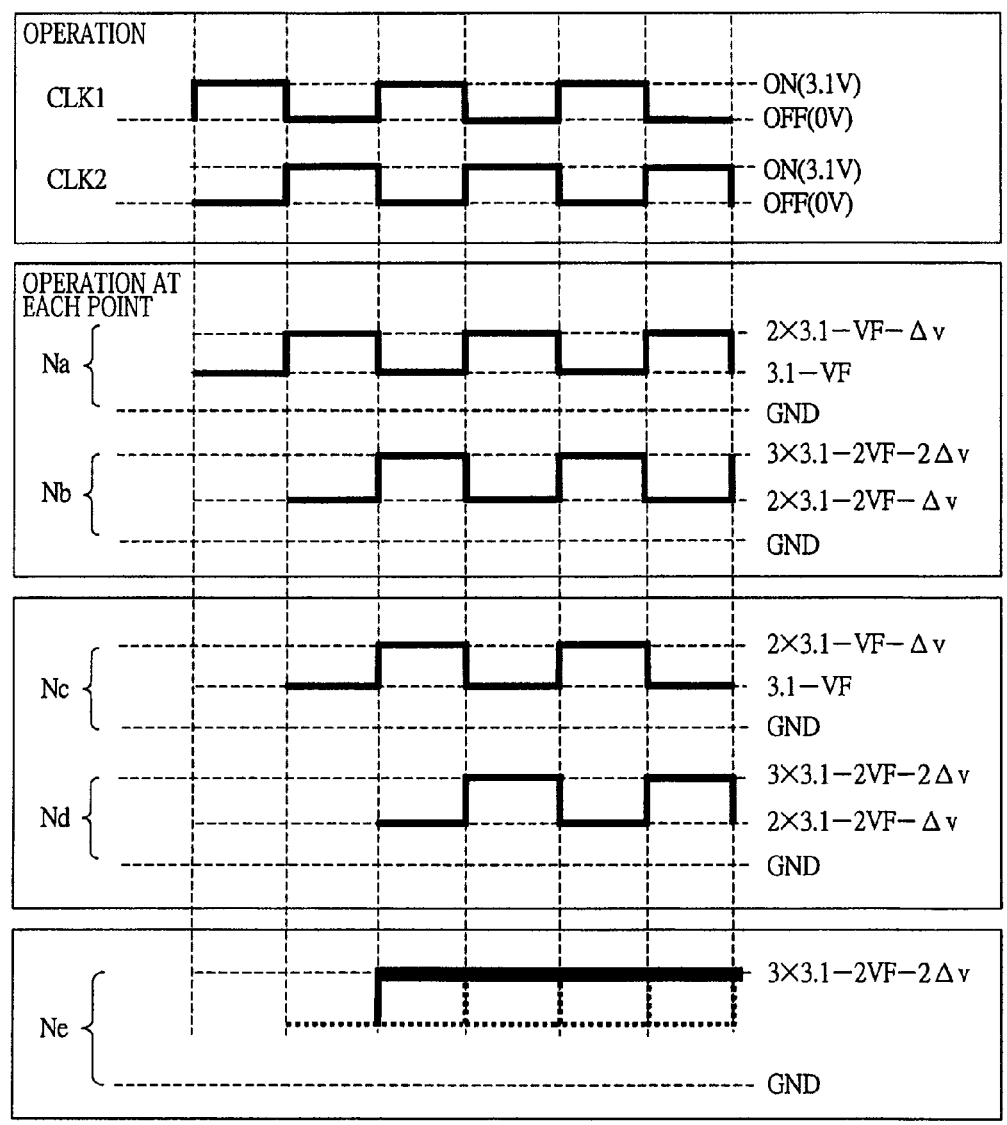
FIG. 5 is a waveform diagram showing a detailed operation example of a booster circuit in FIG. 4.

FIG. 5 is a waveform diagram showing a detailed operation example of the booster circuit BST in FIG. 4. In FIG. 5, the clock signals CLK1 and CLK2 of 3.1 V are used, and VF denotes the forward voltage of the diodes D1 to D4. First, when the clock signal CLK2 is at the 'L' level, the capacitor C1 is charged so that the voltage of the node Na becomes (3.1−VF) V. Then, when the clock signal CLK2 transitions to the 'H' level, the transition amplitude of the clock signal CLK2 is added to the charge voltage of the capacitor C1, so that the voltage of the node Na is boosted to (2×3.1−VF) V. In accordance with the transition of the clock signal CLK2 to the 'L' level and the 'H' level, the voltage of the node Na transitions between (3.1−VF) V and (2×3.1−VF) V. However, in reality, there exists a discharge voltage ΔV according to the oscillation frequency of the clock signal CLK2, the consumption current of the antenna switch control circuit ANTCTL, and the like; therefore, the boosted voltage at the node Na is (2×3.1−VF−ΔV) V.

Similarly, when the clock signal CLK1 is at the 'L' level, the capacitor C2 is charged so that the voltage of the node Nb becomes (voltage at Na−VF) (=2×3.1−2×VF−ΔV) V. Then, when the clock signal CLK1 transitions to the 'H' level, the transition amplitude of the clock signal CLK1 is added to the charge voltage of the capacitor C2, so that the voltage of the node Nb is boosted to (3×3.1−2×VF−ΔV) V. However, in reality, since the above-described discharge voltage ΔV exists, the boosted voltage is (3×3.1−2×VF−2×ΔV) V. In accordance with the transition of the clock signal CLK1 to the 'L' level and the 'H' level, the voltage of the node Nb transitions between (2×3.1−2×VF−ΔV) V and (3×3.1−2×VF−2×ΔV) V.

On the other hand, the voltage of the node Nc operates similarly to the voltage of the node Na, in accordance with the clock signal CLK1 of opposite phase to that of the node Na, and therefore transitions between (3.1−VF) V and (2×3.1−VF−ΔV) V in accordance with the transition of the clock signal CLK1 to the 'L' level and the 'H' level. Similarly, the voltage of the node Nd operates similarly to the voltage of the node Nb, in accordance with the clock signal CLK2 of opposite phase to that of the node Nb, and therefore transitions between (2×3.1−2×VF−ΔV) V and (3×3.1−2×VF−2×ΔV) V in accordance with the transition of the clock signal CLK2 to the 'L' level and the 'H' level.

The voltage of the node Nb is transferred to the node Ne when the clock signal CLK1 is at the 'H' level, and the voltage of the node Nd is transferred to the node Ne when the clock signal CLK2 is at the 'H' level, so that a constant voltage level of (3×3.1−2×VF−2×ΔV) V is generated at the node Ne. Thus, by the interleave-operation of the two charge pump circuits and the combination of outputs thereof, it is possible to generate the boosted voltage VSW2 with small ripples. Since ripples in the voltage VSW2 might cause unnecessary waves emitted from the antenna ANT through the antenna switch device ANTSW, it is advantageous to use such a interleave method. As is obvious from FIG. 5, it is possible to adjust the voltage level VSW2 as appropriate with the forward voltage VF of the diodes D1 to D4, the oscillation frequency (ΔV) of the oscillation circuit OSC, or the like. Further, although not shown in FIG. 5, it is possible to adjust it with the power supply voltage (i.e., the signal level of the clock signals CLK1 and CLK2) of the inverter circuits IV20, IV10, and IV11.

<<Detailed Operation of Overall Control Circuit CTLC and Antenna Switch Control Circuit ANTCTL>>

FIG. 6 is a truth table showing a detailed operation example of the overall control circuit CTLC and the antenna switch control circuit ANTCTL in FIG. 4. In FIG. 6, it is possible to set nine modes (A to E, G, H, J, K) in accordance with the mode setting signal Mctl (combination of TX_EN, BS1, BS2, and TR_SW_EN) from the baseband unit BBU. Further, in accordance with the mode setting signal Mctl, the control circuit ANTCTL outputs, as the antenna switch control signals Sctl, eight control signals (TXLBC, TXLBL, TXHBC, TXHBL, RX1800, RX900, TRXAC, TRXBC) having the respective voltage levels controlled as appropriate.

Although details will be described later, the signals TXLBC and TXLBL are control signals for the transmission antenna switch circuit in the GSM low band, and the signals TXHBC and TXHBL are control signals for the transmission antenna switch circuit in the GSM high band. The signal RX1800 is a control signal for the reception antenna switch circuit in the GSM high band, and the signal RX900 is a control signal for the reception antenna switch circuit in the GSM low band. The signal TRXAC is a control signal for the transmission/reception antenna switch circuit in band A of W-CDMA, and the signal TRXBC is a control signal for the transmission/reception antenna switch circuit in band B of W-CDMA. Although not restricted, band A of W-CDMA is, for example, band 1 (transmission frequencies: 1920 to 1980 MHz, reception frequencies: 2110 to 2170 MHz) defined in 3GPP, and band B of W-CDMA is, for example, band 5 (transmission frequencies: 824 to 849 MHz, reception frequencies: 869 to 894 MHz) defined in 3GPP.

In mode A which is selected by the mode setting signal Mctl and is a sleep mode, all the eight control signals are driven to the 'L' level (GND level), and the generation operation of the antenna switch voltage VSW is not performed. In mode B and mode D which are isolation modes of GSM (low band and high band), the generation operation of the voltage VSW (VSW1) is performed, but all the eight control signals are driven to the 'L' level. In mode C which is a transmission mode of the GSM low band, the signals TXLBC and TXLBL out of the eight control signals are turned to the 'H' level (VSW1 level) and a high-impedance state (HiZ), respectively. In mode E which is a transmission mode of the GSM high band, the signals TXHBC and TXHBL out of the eight control signals are turned to the 'H' level (VSW1 level) and HiZ, respectively.

In mode G which is a reception mode of the GSM high band, the signal RX1800 out of the eight control signals is turned to the 'H' level (VSW1 level). In mode H which is a reception mode of the GSM low band, the signal RX900 out of the eight control signals is turned to the 'H' level (VSW1 level). In mode J which is a transmission/reception mode of band A of W-CDMA, the signal TRXAC out of the eight control signals is turned to the 'H' level (VSW2 level). In mode K which is a transmission/reception mode of band B of W-CDMA, the signal TRXBC out of the eight control signals is turned to the 'H' level (VSW2 level). Thus, in GSM, VSW1 is used as VSW, and in W-CDMA, VSW2 is used as VSW.

<<Detailed Configuration of Main Part of Antenna Switch Device ANTSW>>

Figure 7:
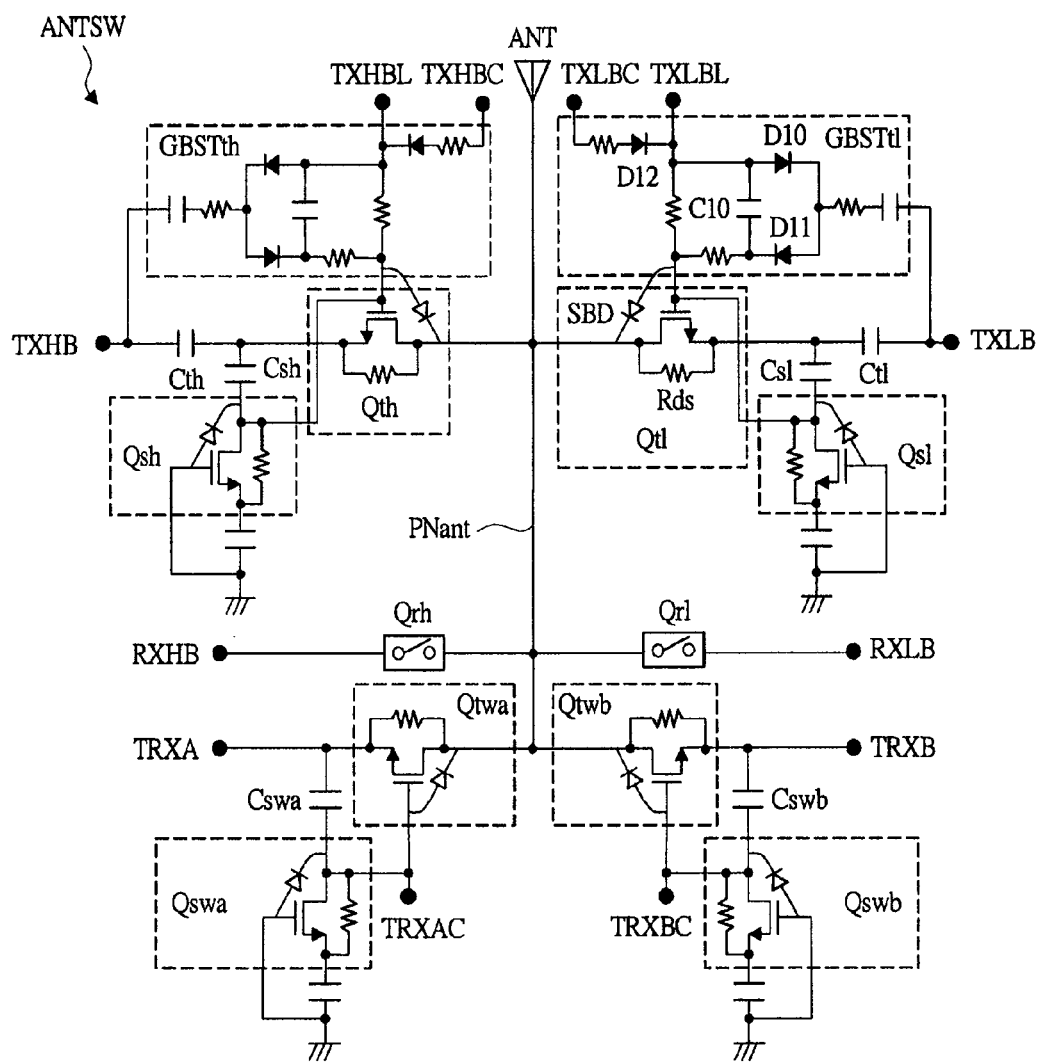
FIG. 7 is a circuit diagram showing a detailed configuration example of the main part of an antenna switch device in the radio communication system of FIG. 1.

FIG. 7 is a circuit diagram showing a detailed configuration example of the main part of the antenna switch device ANTSW in the radio communication system of FIG. 1. The antenna switch device ANTSW shown in FIG. 7 includes ten HEMT elements Qtl, Qth, Qsl, Qsh, Qrl, Qrh, Qtwa, Qtwb, Qswa, and Qswb, two gate booster circuits GBSTtl and GBSTth, and various coupling capacitors Ctl, Cth, Csl, Csh, Cswa, and Cswb. The transistor Qtl has a source-drain path between the transmission terminal TXLB for the GSM low band and the antenna coupling terminal PNant, and the transistor Qth has a source-drain path between the transmission terminal TXHB for the GSM high band and the terminal PNant. The transistor Qrl has a source-drain path between the reception terminal RXLB for the GSM low band and the terminal PNant, and the transistor Qrh has a source-drain path between the reception terminal RXHB for the GSM high band and the terminal PNant. The transistor Qtwa has a source-drain path between the transmission/reception terminal TRXA for band A of W-CDMA and the terminal PNant, and the transistor Qtwb has a source-drain path between a transmission/reception terminal TRXB for band B of W-CDMA and the terminal PNant. The capacitor Ctl is inserted between the terminal TXLB and the transistor Qtl, and the capacitor Cth is inserted between the terminal TXHB and the transistor Qth.

The transistor Qsl has a source-drain path between the node (source) of the transistor Qtl adjacent to the terminal TXLB and the ground voltage GND, and the transistor Qsh has a source-drain path between the node (source) of the transistor Qth adjacent to the terminal TXHB and the ground GND. The transistor Qswa has a source-drain path between the node (source) of the transistor Qtwa adjacent to the terminal TRXA and the ground GND, and the transistor Qswb has a source-drain path between the node (source) of the transistor Qtwb adjacent to the terminal TRXB and the ground GND. The capacitor Csl is inserted between the transistors Qtl and Qsl, and the capacitor Csh is inserted between the transistors Qth and Qsh. The capacitor Cswa is inserted between the transistors Qtwa and Qswa, and the capacitor Cswb is inserted between the transistors Qtwb and Qswb.

Thus, six HEMT elements (Qtl, Qth, Qrl, Qrh, Qtwa, Qtwb) out of the ten HEMT elements are through switches for coupling the transmission terminals, the reception terminals, and the transmission/reception terminals to the antenna ANT. The remaining four HEMT elements (Qsl, Qsh, Qswa, Qswb) are shunt switches for coupling the transmission terminals, the reception terminals, and the transmission/reception terminals to the ground GND. Therefore, this antenna switch has an SP6T configuration. In FIG. 7, the details of the transistors Qrl and Qrh on the GSM reception side are omitted for the sake of simplification. Further, shunt switches which may be provided also for the transistors Qrl and Qrh are omitted as well.

Each HEMT element (typified by Qtl) is of the depression type, includes a resistor Rds of high resistance between the source and the drain, and structurally includes a Schottky barrier diode SBD between the gate and the drain. The drain (through the resistor Rds to the source) of the transistor Qsl and the gate of the transistor Qtl are coupled in common, and the drain (through the resistor Rds to the source) of the transistor Qsh and the gate of the transistor Qth are coupled in common. Further, the drain (through the resistor Rds to the source) of the transistor Qswa and the gate of the transistor Qtwa are coupled in common, and the drain (through the resistor Rds to the source) of the transistor Qswb and the gate of the transistor Qtwb are coupled in common. The gates of the transistors Qsl, Qsh, Qswa, and Qswb are coupled to the ground GND.

The gate of the transistor Qtwa for W-CDMA transmission is driven by the control signal TRXAC shown in FIG. 6, and the gate of the transistor Qtwb for W-CDMA transmission is driven by the control signal TRXBC shown in FIG. 6. On the other hand, the gate of the transistor Qtl for GSM transmission is driven by the gate booster circuit GBSTtl from the control signals TXLBC and TXLBL shown in FIG. 6, and the gate of the transistor Qth for GSM transmission is driven by the gate booster circuit GBSTth from the control signals TXHBC and TXHBL shown in FIG. 6. The gate booster circuits GBSTtl and GBSTth will be described taking the gate booster circuit GBSTtl as an example. The gate booster circuit GBSTtl includes a capacitor C10 and diodes D10 to D12. The capacitor C10 is coupled at one end to the gate of the transistor Qtl through a resistor, and coupled at the other end to the control signal TXLBL. The diode D10 is coupled at its anode to the other end of the capacitor C10, and AC-coupled at its cathode to the terminal TXLB through a resistor and a capacitor. The diode D11 is AC-coupled at its anode to the terminal TXLB through the resistor and the capacitor, and coupled at its cathode to the one end of the capacitor C10. The diode D12 is coupled at its anode to the control signal TXLBC through a resistor, and coupled at its cathode to the control signal TXLBL. The capacitor C10 is provided with resistors at both ends.

<<Detailed Operation of Main Part of Antenna Switch Device ANTSW>>

Figure 8A:
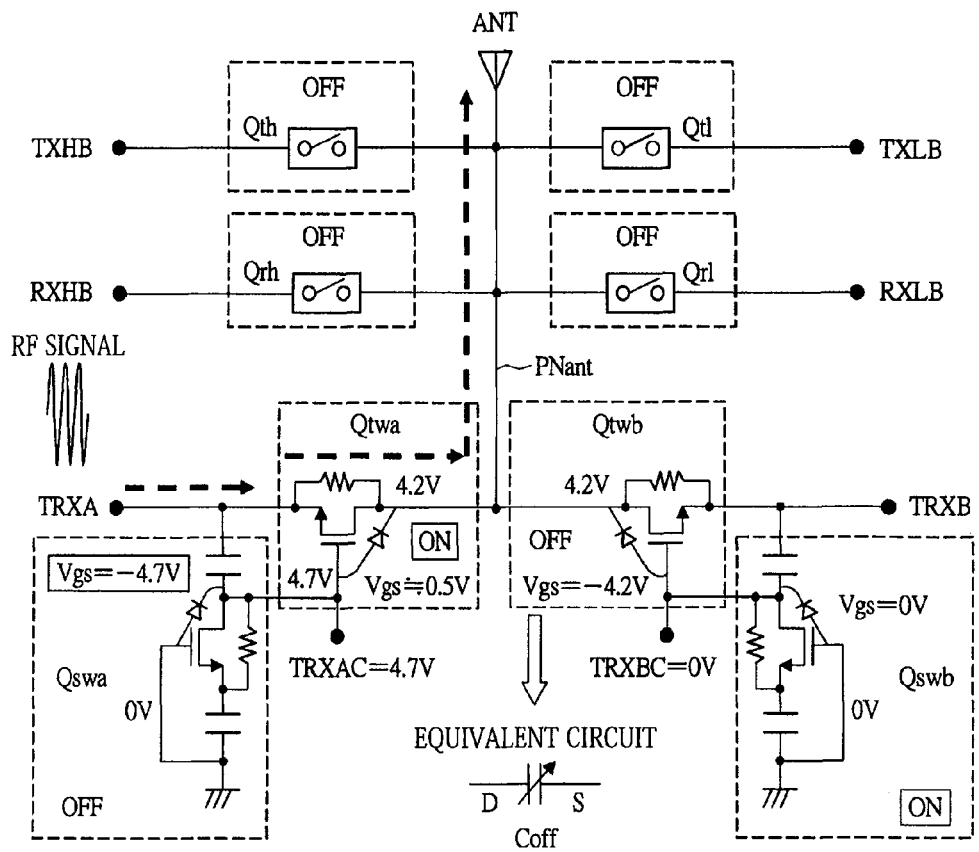
FIG. 8A is an explanation diagram showing an operation example in W-CDMA transmission in the antenna switch device of FIG. 7.
Figure 8B:
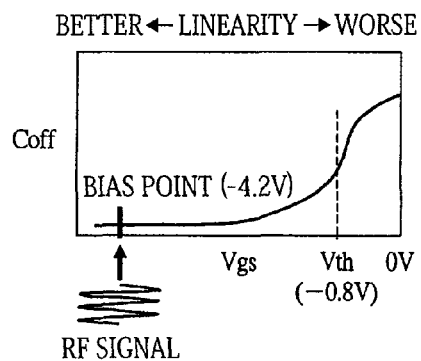
FIG. 8B is a supplementary diagram showing an example of the bias state of an off switch in FIG. 8A.

FIG. 8A is an explanation diagram showing an operation example in W-CDMA transmission in the antenna switch device ANTSW of FIG. 7, and FIG. 8B is a supplementary diagram showing an example of the bias state of an off switch in FIG. 8A. As shown in FIG. 8A, for example, when a transmission signal passes between the transmission terminal TRXA and the antenna ANT, the control signal TRXAC of 4.7 V (VSW2 level) is applied to the gate of the through transistor Qtwa as described above; accordingly, the transistor Qtwa enters a strong on state. At this time, the drain voltage and source voltage of the transistor Qtwa become about 4.2 V by the forward voltage VF (about 0.5 V) drop across the diode SBD between the gate and the drain (source). Further, since the drain and source of the shunt transistor Qswa coupled to the terminal TRXA are coupled to the control signal TRXAC through the resistor Rds, the voltage of 4.7 V is applied to the drain and the source. Since the gate of the transistor Qswa is 0 V, the transistor Qswa is reverse-biased at Vgs (Vgd)=−4.7 V, and enters a deep off state.

On the other hand, the drain voltage and source voltage of the through transistor Qtwb coupled to the terminal TRXB are 4.2 V, and the gate is driven to 0 V by the control signal TRXBC; accordingly, the transistor Qtwb is reverse-biased at Vgs (Vgd)=−4.2 V, and enters a deep off state. Further, since the control signal TRXBC is 0 V and therefore Vgs (Vgd)=0 V, the shunt transistor Qswb coupled to the terminal TRXB enters an on state. The through transistors Qtl, Qth, Qrl, and Qrh (and the shunt transistors Qsl and Qsh (not shown)) coupled to the other terminals TXLB, TXHB, RXLB, and RXHB have the same circuit configuration and operating state as the transistor Qtwb (and Qswb) coupled to the terminal TRXB. That is, the through HEMT elements are turned off, and the shunt HEMT elements are turned on. With this operation, the transmission signal inputted to the terminal TRXA is conveyed with low insertion loss, and outputted to the antenna ANT with great reduction in power leakage to another terminal and the occurrence of distortion.

The occurrence of distortion is affected by the turned-off HEMT elements. The turned-off HEMT element has the characteristic of an off-capacitance Coff as shown in FIG. 8B. If the voltage Vgs of the turned-off HEMT element is around a threshold voltage Vth (e.g., −0.8 V), the characteristic of the off-capacitance Coff is in a nonlinear region, which causes distortion in the transmission signal from the through HEMT element. To suppress the distortion, the voltage Vgs of the turned-off HEMT element is biased toward a linear region (e.g., Vgs=−4.2 V). In the linear region where the turned-off HEMT element is biased, a distortion problem does not occur even if a large signal is externally inputted.

Figure 9:
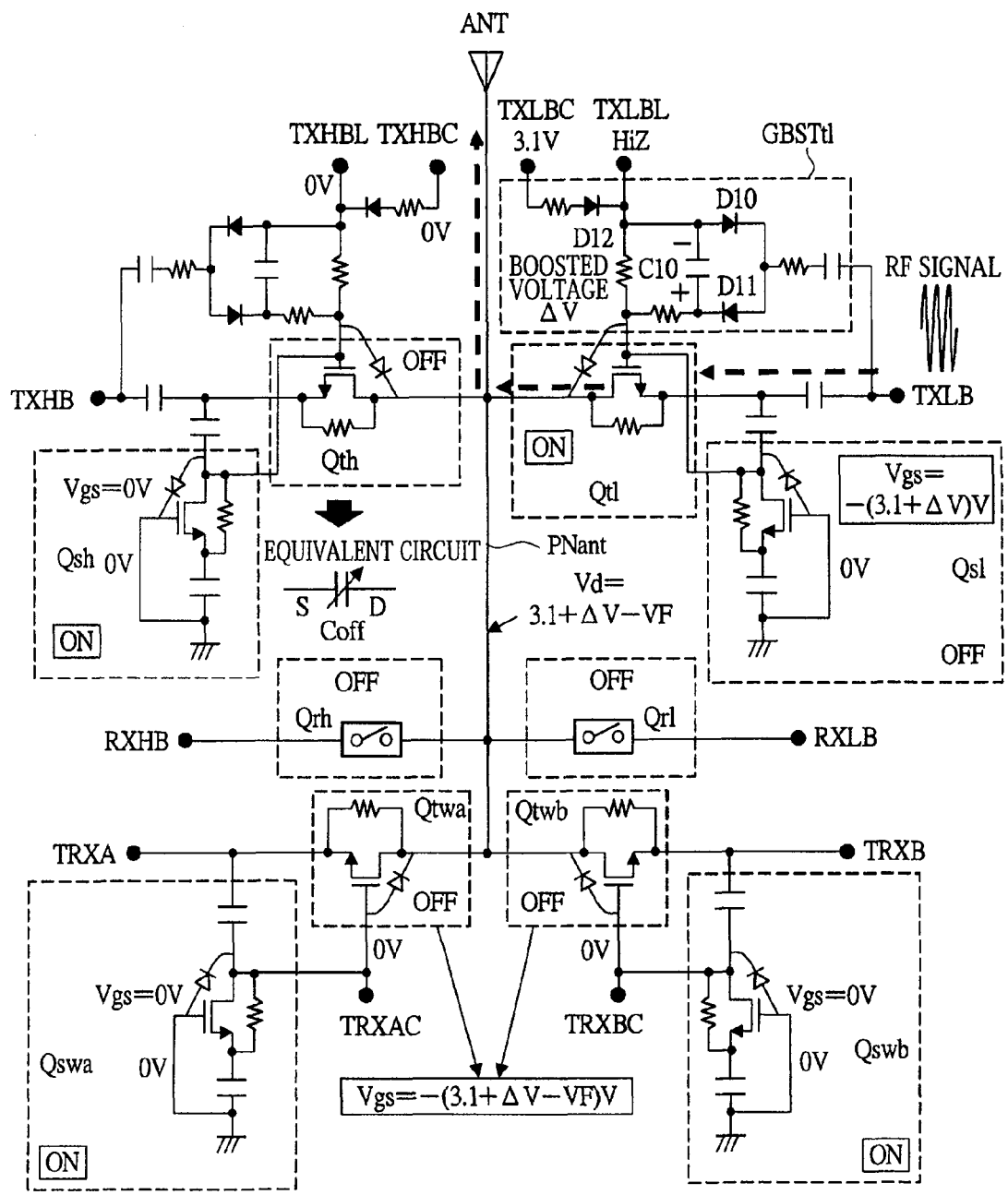
FIG. 9 is an explanation diagram showing an operation example in GSM transmission in the antenna switch device of FIG. 7.

FIG. 9 is an explanation diagram showing an operation example in GSM transmission in the antenna switch device ANTSW of FIG. 7. In the example of FIG. 9, a transmission signal passes between the transmission terminal TXLB and the antenna ANT. The gate booster circuit GBSTtl for driving the through transistor Qtl coupled to the terminal TXLB is a circuit for boosting the gate voltage of the transistor Qtl by detecting and rectifying a large power signal inputted from the terminal TXLB. This circuit can provide a sufficient voltage to the turned-off through HEMT elements and suppress harmonic distortion.

For the booster circuit GBSTtl, the control signal TXLBC is set to 3.1 V, and the control signal TXLBL is set to HiZ, as shown in FIG. 6. When the amplitude of the transmission signal inputted to the terminal TXLB is a plus (TXLB>TXLBC), since TXLB is higher in potential than TXLBC, the diode D10 is turned off and the diode D11 is turned on. At this time, the transmission signal attenuated through the resistor from the terminal TXLB passes the diode D11 for half-wave rectification, so that plus charge is accumulated at the end of the capacitor C10 adjacent to the diode D11. On the other hand, when the amplitude of the transmission signal inputted to the terminal TXLB is a minus (TXLB<TXLBC), the diode D10 is turned on and the diode D11 is turned off. At this time, the transmission signal attenuated through the resistor from the terminal TXLB passes the diode D10 for half-wave rectification, so that minus charge is accumulated at the end of the capacitor C10 adjacent to the diode D10. Thus, by repeating the accumulation of charge in the capacitor C10, the charge in the capacitor C10 is retained so that a constant boosted voltage can be applied to the gate of the transistor Qtl.

The gate voltage of the transistor Qtl boosts a voltage at the antenna coupling terminal PNant through the diode SBD between the gate and the drain (source) to a voltage Vd. Specifically, Vd=(3.1+ΔV−VF) V, where ΔV denotes a voltage boosted by the booster circuit GBSTtl, and VF denotes the forward voltage of the diode SBD. At this time, the source and drain voltages of the through transistors Qth, Qrl, Qrh, Qtwa, and Qtwb coupled to the terminals TXHB, RXLB, RXHB, TRXA, and TRXB are the same potential as the voltage Vd through the resistor Rds, and the gate voltages thereof are 0 V; accordingly, these transistors enter the deep off state. Thereby, even though the large transmission signal is inputted from the terminal TXLB, the off state can be stably maintained, and no problem level of distortion with the off-capacitance Coff can be ensured. Since the gate voltage of the transistor Qtl is (3.1+ΔV) V, the shunt transistor Qsl coupled to the terminal TXLB is biased at Vgs=−(3.1+ΔV) V, and enters the deep off state. The other shunt HEMT elements enter the on state because Vgs=0 V.

Thus, by providing the gate booster circuit at the gate of the antenna switch for GSM transmission, even though the voltage level of the control signal from the antenna switch control circuit ANTCTL is 3.1 V in GSM, the antenna switch device ANTSW can operate without problems. In this example, each antenna switch circuit is configured with one HEMT element, but may actually be configured with a plurality of HEMT elements coupled in series in terms of withstand voltage.

<<Effect of This Embodiment>>

Figure 10:
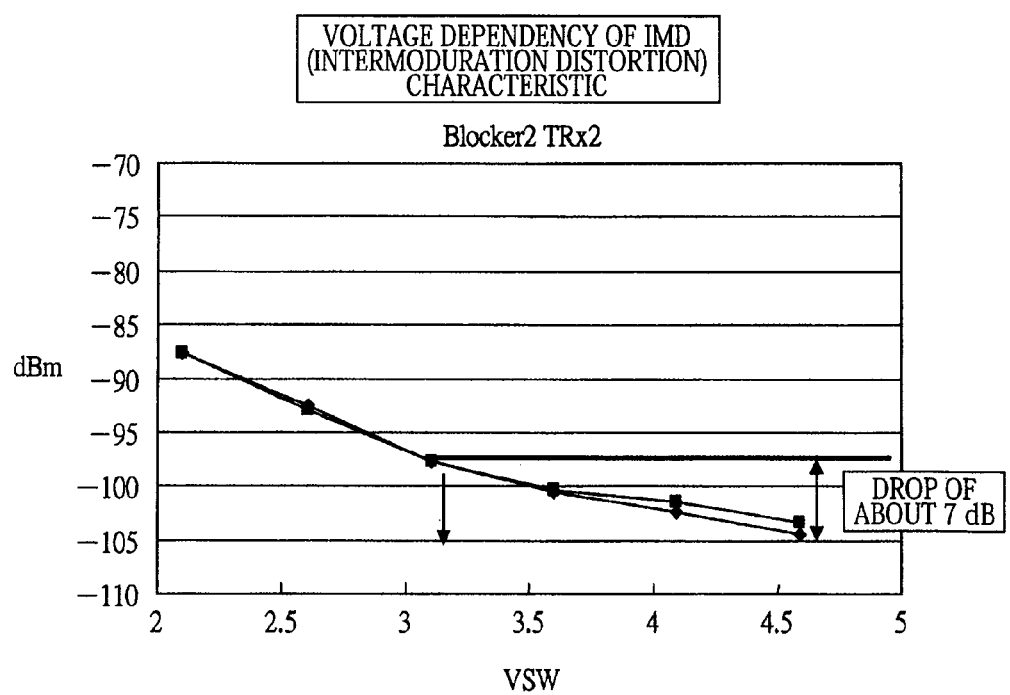
FIG. 10 is a graph showing the result of verifying the effect of reducing intermodulation distortion by using the radio communication system of FIG. 1.

FIG. 10 is a graph showing the result of verifying the effect of reducing intermodulation distortion (IMD) by using the radio communication system of FIG. 1. A transmission signal (836 MHz) of 20 dBm is inputted through the transmission terminal of the antenna switch device ANTSW, an interference wave (791 MHz) of −15 dBm is inputted from the antenna, and power levels with a given frequency of 881 MHz (=2×836−791) arising at the reception terminal are observed while varying the gate voltage (antenna switch voltage VSW) of the antenna switch (HEMT element), thereby obtaining the graph of FIG. 10. In W-CDMA, an IMD characteristic value is preferably less than −101 dBm for example. As shown in FIG. 10, in small VSW, the IMD characteristic is degraded by the off-capacitance Coff of the turned-off antenna switch. For example, if the voltage VSW=3.1 V, the power level is −97 dBm. Then, if the voltage VSW is set to 4.7 V, the power level becomes −104 dBm, with 7 dBm of improvement, which fully satisfies the desired value in W-CDMA.

<<Outward Appearance of Radio-Frequency Module>>

Figure 11:
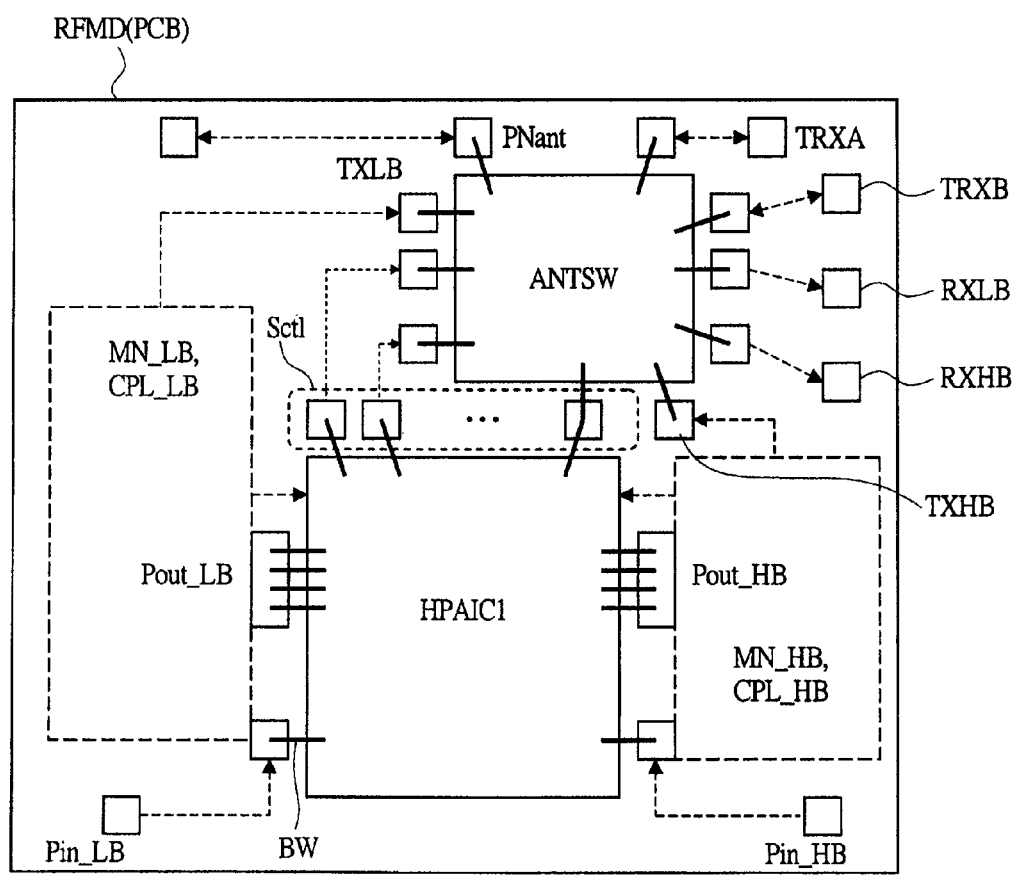
FIG. 11 is a schematic plan view showing an outline example of a radio-frequency module in the radio communication system of FIG. 1.

FIG. 11 is a schematic plan view showing an outline example of the radio-frequency module RFMD in the radio communication system of FIG. 1. In the configuration of the radio-frequency module RFMD, two semiconductor chips (HPAIC1, ANTSW) are mounted over a wiring board PCB (e.g., a ceramic board, a glass epoxy board, or the like) containing a plurality of wiring layers, and these are coupled as appropriate via wiring layers. As described above, the amplifier device HPAIC1 is implemented by e.g. a silicon substrate, and the switch device ANTSW is implemented by e.g. a substrate of a compound semiconductor such as GaAs. In FIG. 11, various terminals etc. for the GSM low band are disposed on the left side of the amplifier device HPAIC1, and various terminals etc. for the GSM high band are disposed on the right side. Further, various terminals for the antenna switch control signals Sctl are disposed on the upper side of the amplifier device HPAIC1, and the switch device ANTSW is mounted on the upper side thereof.

An input terminal for the low-band power input signal Pin_LB is disposed on the left side of the amplifier device HPAIC1, and coupled to the amplifier device HPAIC1 via a bonding wire BW. The amplifier device HPAIC1 amplifies the input signal Pin_LB, and outputs the low-band power output signal Pout_LB to an output terminal via a wire BW. An impedance matching circuit MN_LB and a coupler CPL_LB are disposed through the output terminal (Pout_LB). The matching circuit MN_LB and the coupler CPL_LB are implemented by wiring patterns over the wiring board PCB and various external components (capacitors etc.) configured with SMD (Surface Mount Device) etc. The coupler CPL_LB is a circuit for detecting the power level of the output signal Pout_LB. The detection result is fed back to the amplifier device HPAIC1, thereby adjusting the power level of the output signal Pout_LB to a predetermined level.

An input terminal for the high-band power input signal Pin_HB is disposed on the right side of the amplifier device HPAIC1, and coupled to the amplifier device HPAIC1 via a bonding wire BW. The amplifier device HPAIC1 amplifies the input signal Pin_HB, and outputs the high-band power output signal Pout_HB to an output terminal via a wire BW. An impedance matching circuit MN_HB and a coupler CPL_HB are disposed through the output terminal (Pout_HB). The matching circuit MN_HB and the coupler CPL_HB are implemented by wiring pattern over the wiring board PCB and various external components (capacitors etc.) configured with SMD etc. The coupler CPL_HB is a circuit for detecting the power level of the output signal Pout_HB. The detection result is fed back to the amplifier device HPAIC1, thereby adjusting the power level of the output signal Pout_HB to a predetermined level.

A plurality of terminals for the control signals Sctl shown in FIG. 6 are disposed on the upper side of the amplifier device HPAIC1. The amplifier device HPAIC1 outputs the control signals Sctl to the terminals via wires BW, and the control signals are transferred over the wiring board PCB and inputted to the switch device ANTSW via wires BW. The various terminals (TXLB, TXHB, RXLB, RXHB, TRXA, TRXB, PNant) shown in FIGS. 1, 7, etc. are disposed around and coupled via wires BW to the switch device ANTSW. Among these terminals, the signal transferred through the matching circuit MN_LB is inputted to the transmission terminal TXLB for the GSM low band, and the signal transferred through the matching circuit MN_HB is inputted to the transmission terminal TXHB for the GSM high band.

<<Structure of LDMOSFET>>

Figure 12:
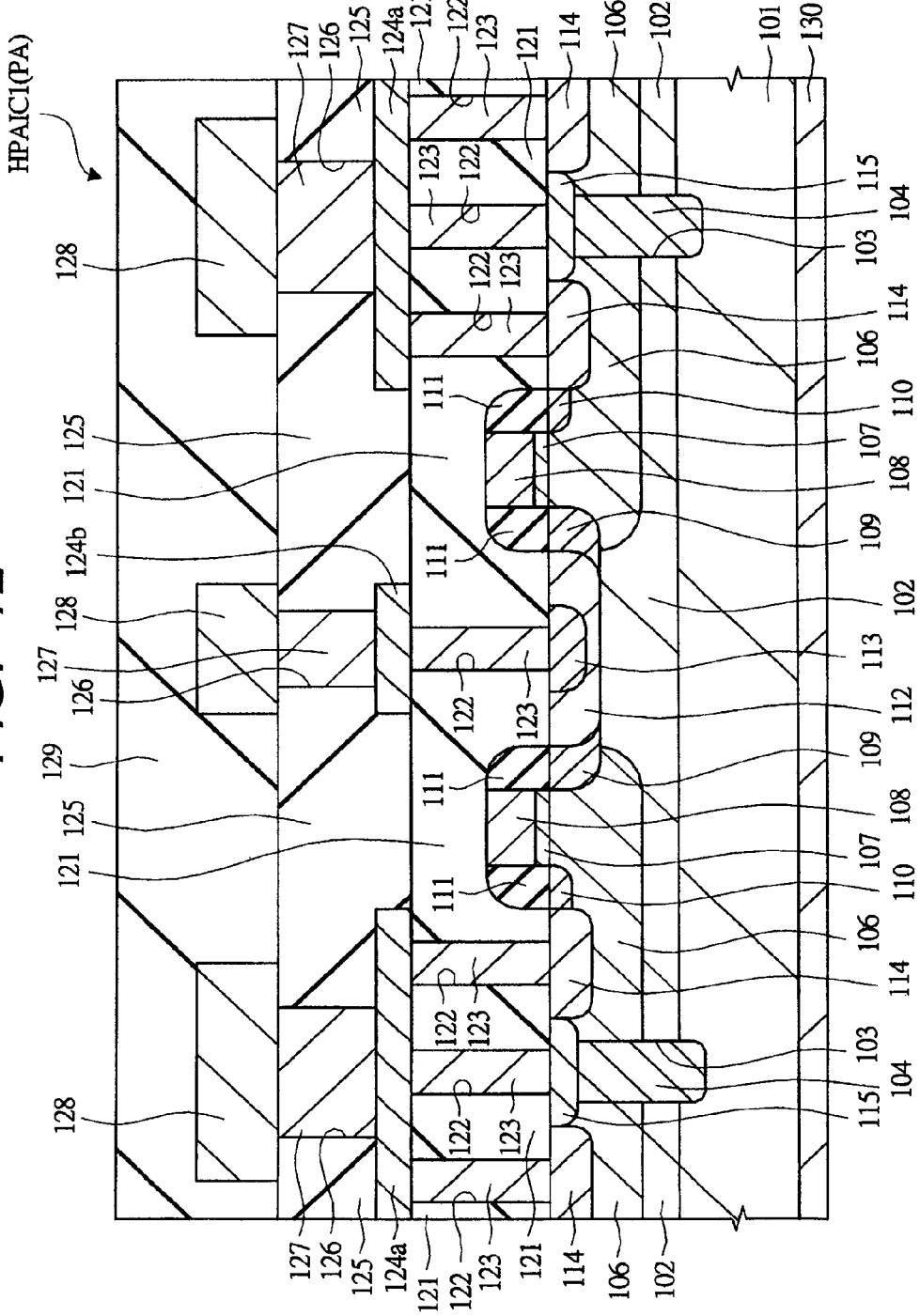
FIG. 12 is a sectional view showing a structure example of a GSM power amplifier circuit included in the radio-frequency module in the radio communication system of FIG. 1.

FIG. 12 is a sectional view showing a structure example of the GSM power amplifier circuit PA included in the radio-frequency module RFMD in the radio communication system of FIG. 1. As described above, the GSM power amplifier circuits PA1*l* to PA3*l* and PA1*h* to PA3*h* can be configured with LDMOSFETs (Laterally Diffused MOSFETs). As shown in FIG. 12, an epitaxial layer 102 made of p− type monocrystalline silicon is formed over the main surface of a semiconductor substrate 101 made of p+ type monocrystalline silicon, and a p type well 106 as a punch-through stopper for suppressing the extension of a depletion layer from the drain region to the source region of the LDMOSFET is formed over part of the main surface of the epitaxial layer 102. A gate electrode 108 of the LDMOSFET is formed over the surface of the p type well 106 through a gate insulating film 107 such as a silicon oxide film. The gate electrode 108 is made of e.g. an n type polycrystalline silicon film or a laminated film of an n type polycrystalline silicon film and a metal silicide film, and side walls 111 made of silicon oxide films or the like are formed on both sides of the gate electrode 108.

The source region and drain region of the LDMOSFET are formed apart from each other with an internal channel forming region of the epitaxial layer 102 interposed therebetween. The drain region is comprised of an n− type offset drain region 109 adjoining the channel forming region, an n type offset drain region 112 adjoining the n− type offset drain region 109 and formed apart from the channel forming region, and an n+ type offset drain region 113 adjoining the n type offset drain region 112 and formed further apart from the channel forming region. Among the n− type offset drain region 109, the n type offset drain region 112, and the n+ type offset drain region 113, the n− type offset drain region 109 closest to the gate electrode 108 has the lowest impurity concentration, and the n+ type offset drain region 113 most apart from the gate electrode 108 has the highest impurity concentration.

The source region of the LDMOSFET is comprised of an n-type source region 110 adjoining the channel forming region and an n+ type source region 114 adjoining the n− type source region 110, formed apart from the channel forming region, and having a higher impurity concentration than the n− type source region 110. A p type halo region (not shown) also can be formed under the n− type source region 110. A p type punch layer 104 adjoining the n+ type source region 114 is formed at the end of the n+ type source region 114 opposite to the n-type source region 110. A p+ type semiconductor region 115 is formed near the surface of the p type punch layer 104. The p type punch layer 104 is a conductive layer for electrically coupling the source region of the LDMOSFET with the semiconductor substrate 101, and is formed, for example, a p-type polycrystalline silicon film embedded in a trench 103 formed in the epitaxial layer 102.

Respective plugs 123 in contact holes 122 formed in an insulating film 121 (interlayer insulating film) are formed over and coupled to the p type punch layer 104 (the p+ type semiconductor region 115), the source region (the n+ type source region 114), and the drain region (the n+ type offset drain region 113) of the LDMOSFET. A source electrode 124*a* is coupled through the plugs 123 to the p type punch layer 104 (the p+ type semiconductor region 115) and the source region (the n+ type source region 114), and a drain electrode 124*b* is coupled through the plug 123 to the drain region (the n+ type offset drain region 113).

Respective wire lines 128 are coupled to the source electrode 124*a* and the drain electrode 124*b* via plugs 127 in through holes 126 formed in an insulating film (interlayer insulating film) 125 covering the source electrode 124*a* and the drain electrode 124*b*. A surface protective film (insulating film) 129 which is a laminated film of a silicon oxide film and a silicon nitride film is formed over the wire lines 128. Although not shown, pad electrodes (bonding pads) are formed with the wire lines 128 (and gold films or the like formed thereover) exposed from openings formed in the surface protective film 129. Further, a back surface electrode (source back surface electrode) 130 is formed at the back surface of the semiconductor substrate 101.

<<Structure of HEMT>>

Figure 13:
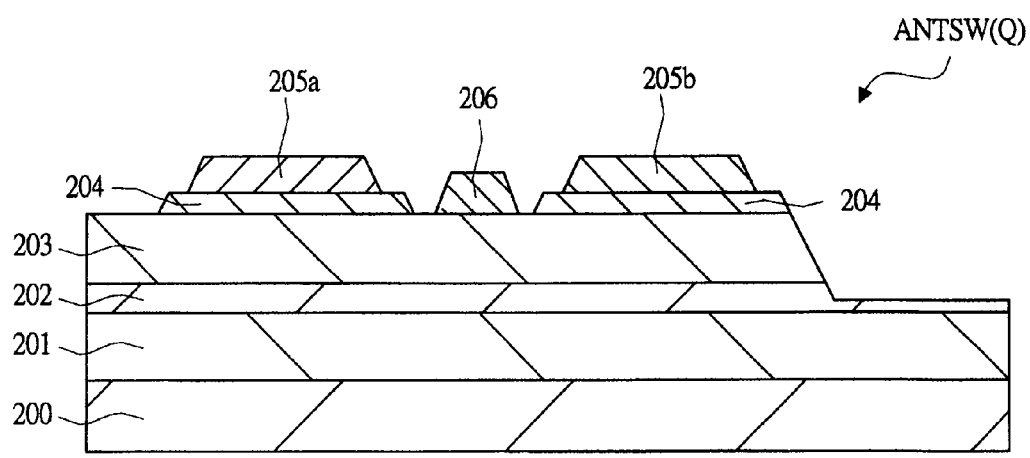
FIG. 13 is a sectional view showing a structure example of the antenna switch device included in the radio-frequency module in the radio communication system of FIGS. 1 and 7.

FIG. 13 is a sectional view showing a structure example of the antenna switch device ANTSW included in the radio-frequency module RFMD in the radio communication system of FIGS. 1 and 7. As described above, the antenna switch circuits in the switch device ANTSW can be configured with HEMT elements. In FIG. 13, an epitaxial layer 201 is formed over a semi-insulating substrate 200. The semi-insulating substrate 200 is configured with a GaAs substrate of a compound semiconductor, and will be described below. That is, if a certain type of impurity is added in a compound semiconductor having a large band gap, a deep level is formed in the band gap. Further, electrons and positive holes of the deep level are fixed, and the electron density of a conduction band or the hole density of a valence band decreases greatly, so that the compound semiconductor becomes nearly insulation. Such a substrate is called the semi-insulating substrate. In the GaAs substrate, Cr, In, oxygen, or the like is added or arsenic is introduced excessively, so that a deep level is formed for a semi-insulating substrate.

The epitaxial layer 201 formed over the semi-insulating substrate 200 is formed of e.g. a GaAs layer. A buffer layer 202 is formed over the epitaxial layer 201, and an AlGaAs layer 203 is formed over the buffer layer 202. The AlGaAs layer 203 is processed in a mesa shape and undergoes element isolation. Further, a gate electrode 206 is formed over the AlGaAs layer 203. The gate electrode 206 is formed of a metal layer e.g. with Pt (platinum) as the bottom layer, that is, a film laminated with Pt, Ti (titanium), Pt, and Au (gold) in order from the bottom. Thereby, the AlGaAs layer 203 and the gate electrode 206 (the bottom layer of Pt) form a Schottky junction. Further, n type GaAs layers 204 are formed with the gate electrode 206 spaced therebetween, and ohmic electrodes 205a and 205b are formed over the n type GaAs layers 204. The ohmic electrodes 205a and 205b make ohmic contact with the n type GaAs layers 204.

In the above-described high electron mobility transistor (HEMT), the epitaxial layer 201 (GaAs layer) and the AlGaAs layer 203 both high in resistance are laminated over the semi-insulating substrate (compound semiconductor substrate) 200, and a triangular well potential developed at the heterojunction interface between the GaAs layer and the AlGaAs layer is utilized. The high electron mobility transistor (HEMT) has the Schottky barrier type gate electrode 206 of the metal film formed over the surface of the AlGaAs layer 203, and has a structure in which the ohmic source and drain electrodes 205a and 205b for causing current to flow through the heterojunction interface are provided with the gate electrode 206 interposed therebetween.

The high electron mobility transistor (HEMT) utilizes a two-dimensional electron gas formed in the well potential as carriers. Since the width of the well potential existing in the heterojunction interface is about as small as the wavelength of each electron, and the electron can only take two-dimensional motion substantially along the interface, high electron mobility can be obtained. Due to the high mobility characteristic of the two-dimensional electron gas, the high electron mobility transistor is excellent in high frequency characteristic and high-speed characteristic and very low in noise; accordingly, the high electron mobility transistor is used in the antenna switch which requires high-speed capability.

<<General Configuration of Cellular Phone System (Radio Communication System)>>

Figure 14:
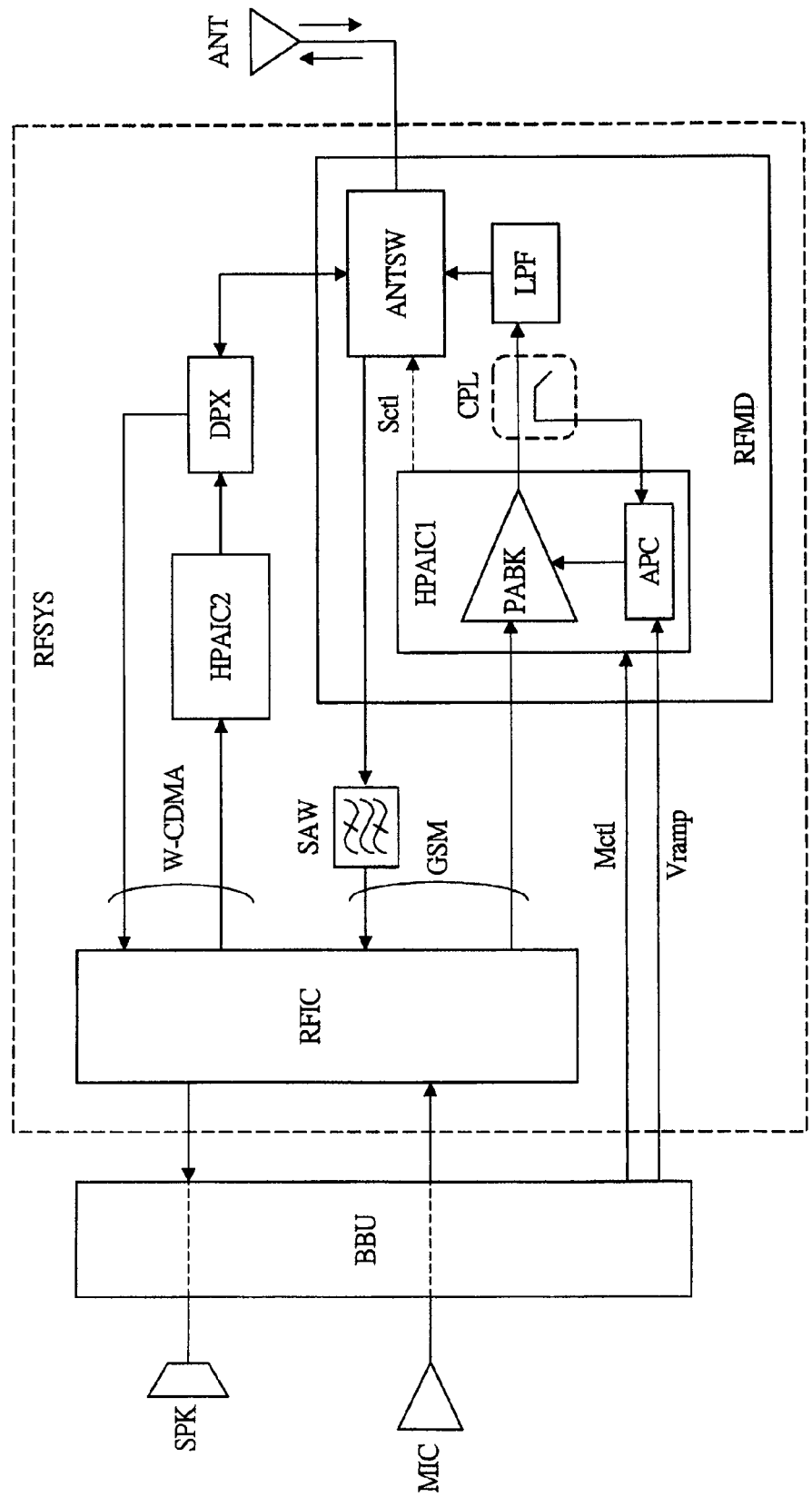
FIG. 14 is a block diagram showing a configuration example of a cellular phone system to which the radio communication system according to the embodiment of the invention is applied.

FIG. 14 is a block diagram showing a configuration example of a cellular phone system to which the radio communication system according to the embodiment of the invention is applied. The cellular phone system of FIG. 14 includes a baseband unit BBU, a radio-frequency system unit RFSYS, an antenna ANT, a speaker SPK, and a microphone MIC. The baseband unit BBU converts an analog signal used in e.g. the speaker SPK and the microphone MIC into a digital signal, performs various kinds of digital signal processing (modulation, demodulation, digital filtering, etc.) associated with communication, and outputs various kinds of control signals associated with communication. The control signals includes the mode setting signal Mctl for switching among the various operation modes such as transmission and reception and a power designation signal Vramp for designating a transmission power.

The radio-frequency system unit RFSYS includes the radio-frequency signal processing device RFIC, a SAW (Surface Acoustic Wave) filter, the radio-frequency module RFMD, the high-frequency power amplifier device HPAIC2, and the duplexer DPX. As shown in FIG. 1 etc., the signal processing device RFIC includes the transmission mixer circuits, the reception mixer circuits, the low-noise amplifier circuits, and performs frequency conversion (up-conversion, down-conversion) between a baseband signal mainly used in the baseband unit BBU and a radio-frequency signal used in the radio-frequency module RFMD. The radio-frequency module RFMD is implemented by e.g. a single module wiring board, and the high-frequency power amplifier device HPAIC1, a coupler CPL, a low-pass filter LPF, the antenna switch device ANTSW, and the like are mounted over the wiring board. As shown in FIG. 1 etc., the amplifier device HPAIC2 amplifies a W-CDMA transmission signal outputted from the signal processing device RFIC, and the duplexer DPX outputs the W-CDMA transmission signal to the switch device ANTSW and outputs a W-CDMA reception signal inputted from the switch device ANTSW to the signal processing device RFIC.

The amplifier device HPAIC1 includes a power amplifier circuit unit PABK for amplifying a transmission signal outputted from a transmission mixer circuit or the like in the signal processing device RFIC and an automatic power control circuit APC for controlling the transmission power. The control circuit APC is included in the overall control circuit CTLC shown in FIG. 1. The coupler CPL detects the transmission power of the amplifier circuit unit PABK and outputs the detection result to the control circuit APC. The control circuit APC controls the amplifier circuit unit PABK based on the signal Vramp notified from the baseband unit BBU and the detection result by the coupler CPL. The low-pass filter LPF performs filtering, impedance matching, and the like on the transmission signal of the amplifier circuit unit PABK, and outputs the resulting signal to the switch device ANTSW. The switch device ANTSW switches among the switches, based on the antenna switch control signals Sctl generated by the amplifier device HPAIC1 in accordance with the mode setting signal Mctl from the baseband unit BBU. Based on the control signals Sctl, the switch device ANTSW transfers the GSM transmission signal from the low-pass filter LPF to the antenna ANT, transfers a GSM reception signal from the antenna ANT to the SAW filter, and transfers a W-CDMA transmission/reception signal between the duplexer DPX and the antenna ANT. The SAW filter extracts only a necessary band from the GSM reception signal and outputs it to the signal processing device RFIC. In the signal processing device RFIC, a low-noise amplifier circuit amplifies the reception signal from the SAW filter, and a reception mixer circuit converts the amplified reception signal into a baseband signal.

While the invention made above by the present inventors has been described specifically based on the illustrated embodiments, the present invention is not limited thereto, and various changes and modifications can be made thereto without departing from the spirit and scope of the invention.

What is claimed is:

1. A radio-frequency module comprising:
a first semiconductor chip;
a second semiconductor chip; and a wiring board where the first and second semiconductor chips are mounted, the first semiconductor chip comprising:

a first power amplifier circuit which amplifies an input signal of a first frequency band and outputs a transmission signal of the first frequency band;

a voltage selection circuit which selects and outputs a first voltage level or a second voltage level; and a control circuit which, in response to a mode setting signal indicative of the first frequency band or a second frequency band, controls the first power amplifier circuit and the voltage selection circuit and outputs a first control signal and a second control signal using output of the voltage selection circuit, the second semiconductor chip comprising:

a first transmission terminal to which the transmission signal of the first frequency band from the first power amplifier circuit is inputted;

a second transmission terminal to which a transmission signal of the second frequency band is inputted;

an antenna coupling terminal;

a first switch which is provided between the first transmission terminal and the antenna coupling terminal and on/off-controlled by a voltage level of the first control signal; and a second switch which is provided between the second transmission terminal and the antenna coupling terminal and on/off-controlled by a voltage level of the second control signal, wherein the voltage selection circuit comprises an oscillation circuit and generates the second voltage level by boosting the first voltage level using a clock signal from the oscillation circuit, wherein when the second frequency band is selected by the mode setting signal, the control circuit causes the voltage selection circuit to select the second voltage level, and respectively turns off the first switch and turns on the second switch by outputting the first and second control signals having an amplitude between a ground voltage level and the second voltage level, wherein when the first frequency band is selected by the mode setting signal, the control circuit stops the oscillation circuit of the voltage selection circuit and causes the voltage selection circuit to select the first voltage level, and respectively turns on the first switch and turns off the second switch by outputting the first and second control signals having an amplitude between the ground voltage level and the first voltage level.

2. The radio-frequency module according to claim 1, wherein the second semiconductor chip further comprises a first booster circuit which boosts the voltage level of the first control signal using power inputted to the first transmission terminal and turns on the first switch using the boosted voltage.

3. The radio-frequency module according to claim 2, wherein the first and second switches are HEMT elements.

4. The radio-frequency module according to claim 2, wherein the first power amplifier circuit comprises a MISFET as an amplifying element.

5. The radio-frequency module according to claim 1, wherein the voltage selection circuit further comprises, in addition to the oscillation circuit:

a reference voltage generation circuit for generating a reference voltage independent of external environment;

a first voltage generation circuit for generating the first voltage level using the reference voltage;

a second booster circuit for generating the second voltage level by performing a charge pump operation using the first voltage level and the clock signal from the oscillation circuit; and a selector switch for selecting the first voltage level or the second voltage level.

6. The radio-frequency module according to claim 5, wherein the second booster circuit comprises:

a first charge pump circuit for performing a charge pump operation using the first voltage level and a positive side of the clock signal from the oscillation circuit;

a second charge pump circuit for performing a charge pump operation using the first voltage level and a negative side of the clock signal from the oscillation circuit; and a combination circuit for generating the second voltage level by alternately combining an output voltage from the first charge pump circuit and an output voltage from the second charge pump circuit every half cycle of the clock signal.

7. The radio-frequency module according to claim 1, wherein the first frequency band is a GSM frequency band, and the second frequency band is a W-CDMA frequency band.

8. A radio communication system comprising:

a first power amplifier device;

a second power amplifier device;

an antenna switch device; and a duplexer, the devices being configured with different semiconductor chips, the second power amplifier device comprising:

a second power amplifier circuit which amplifies an input signal of a second frequency band and outputs a transmission signal of the second frequency band to the duplexer, the first power amplifier device comprising:

a first power amplifier circuit which amplifies an input signal of a first frequency band and outputs a transmission signal of the first frequency band;

a voltage selection circuit which selects and outputs a first voltage level or a second voltage level; and a control circuit which, in response to a mode setting signal indicative of the first frequency band or the second frequency band, controls the first power amplifier circuit and the voltage selection circuit and outputs a first control signal and a second control signal using output of the voltage selection circuit, the antenna switch device comprising:

a first transmission terminal to which the transmission signal of the first frequency band from the first power amplifier circuit is inputted;

a first transmission/reception terminal to which the transmission signal of the second frequency band outputted through the duplexer from the second power amplifier circuit is inputted and from which a reception signal of the second frequency band is outputted to the duplexer;

an antenna coupling terminal;

a first switch which is provided between the first transmission terminal and the antenna coupling terminal and on/off-controlled by a voltage level of the first control signal; and a second switch which is provided between the first transmission/reception terminal and the antenna coupling terminal and on/off-controlled by a voltage level of the second control signal, wherein the voltage selection circuit comprises an oscillation circuit and generates the second voltage level by boosting the first voltage level using a clock signal from the oscillation circuit, wherein when the second frequency band is selected by the mode setting signal, the control circuit causes the voltage selection circuit to select the second voltage level, and respectively turns off the first switch and turns on the second switch by outputting the first and second control signals having an amplitude between a ground voltage level and the second voltage level, and wherein when the first frequency band is selected by the mode setting signal, the control circuit stops the oscillation circuit of the voltage selection circuit and causes the voltage selection circuit to select the first voltage level, and respectively turns on the first switch and turns off the second switch by outputting the first and second control signals having an amplitude between the ground voltage level and the first voltage level.

9. The radio communication system according to claim 8, wherein the antenna switch device further comprises: a first booster circuit which boosts the voltage level of the first control signal using power inputted to the first transmission terminal and turns on the first switch using the boosted voltage.

10. The radio communication system according to claim 9, wherein the first and second switches are HEMT elements.

11. The radio communication system according to claim 10,
wherein the first power amplifier circuit comprises a MISFET as an amplifying element, and
wherein the second power amplifier circuit comprises a heterojunction bipolar transistor as an amplifying element.

12. The radio communication system according to claim 8, wherein the voltage selection circuit further comprises, in addition to the oscillation circuit:

a reference voltage generation circuit for generating a reference voltage independent of external environment;
a first voltage generation circuit for generating the first voltage level using the reference voltage;
a second booster circuit for generating the second voltage level by performing a charge pump operation using the first voltage level and the clock signal from the oscillation circuit; and
a selector switch for selecting the first voltage level or the second voltage level.

13. The radio communication system according to claim 12, wherein the second booster circuit comprises:
a first charge pump circuit for performing a charge pump operation using the first voltage level and a positive side of the clock signal from the oscillation circuit;
a second charge pump circuit for performing a charge pump operation using the first voltage level and a negative side of the clock signal from the oscillation circuit; and
a combination circuit for generating the second voltage level by alternately combining an output voltage from the first charge pump circuit and an output voltage from the second charge pump circuit every half cycle of the clock signal.

14. The radio communication system according to claim 8, wherein the first frequency band is a GSM frequency band, and
wherein the second frequency band is a W-CDMA frequency band.

15. The radio communication system according to claim 8, wherein the first power amplifier device and the antenna switch device are mounted over a same module wiring board, and
wherein the second power amplifier device and the duplexer are disposed outside the module wiring board.

* * * * *